United States Patent
Azuhata

(10) Patent No.: US 12,041,369 B2
(45) Date of Patent: Jul. 16, 2024

(54) SOLID-STATE IMAGING ELEMENT, IMAGING DEVICE, AND METHOD OF CONTROLLING SOLID-STATE IMAGING ELEMENT FOR CORRECTING A POTENTIAL OF AN INPUT NODE OF A DIFFERENTIAL AMPLIFIER

(71) Applicant: SONY SEMICONDUCTOR SOLUTIONS CORPORATION, Kanagawa (JP)

(72) Inventor: Satoshi Azuhata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 16 days.

(21) Appl. No.: 17/906,124

(22) PCT Filed: Jan. 26, 2021

(86) PCT No.: PCT/JP2021/002568
§ 371 (c)(1),
(2) Date: Sep. 12, 2022

(87) PCT Pub. No.: WO2021/192577
PCT Pub. Date: Sep. 30, 2021

(65) Prior Publication Data
US 2023/0111897 A1    Apr. 13, 2023

(30) Foreign Application Priority Data

Mar. 23, 2020   (JP) ................................. 2020-050476

(51) Int. Cl.
*H04N 25/772*   (2023.01)
*H04N 25/60*    (2023.01)
(Continued)

(52) U.S. Cl.
CPC ......... *H04N 25/772* (2023.01); *H04N 25/703* (2023.01); *H04N 25/768* (2023.01); *H04N 25/60* (2023.01)

(58) Field of Classification Search
CPC .... H04N 25/772; H04N 25/703; H04N 25/60; H04N 25/79; H04N 25/77; H04N 25/778; H04N 25/78
See application file for complete search history.

(56) References Cited

U.S. PATENT DOCUMENTS

| 9,979,916 | B2* | 5/2018 | Hiyama | ............... H04N 25/778 |
| 2015/0136955 | A1 | 5/2015 | Wein | |
| 2016/0150176 | A1* | 5/2016 | Hiyama | ............... H04N 25/772 348/301 |

FOREIGN PATENT DOCUMENTS

| JP | 2018-019335 A | 2/2018 |
| JP | 6690539 B2 | 4/2020 |
| WO | 2016/031594 A1 | 3/2016 |

OTHER PUBLICATIONS

International Search Report and Written Opinion of PCT Application No. PCT/JP2021/002568, dated Apr. 27, 2021, 09 pages of ISRWO.

(Continued)

*Primary Examiner* — Nicholas G Giles
(74) *Attorney, Agent, or Firm* — CHIP LAW GROUP

(57) ABSTRACT

In a solid-state imaging element that compares a reference signal and a pixel signal with each other, a frame rate is improved.
A differential amplifier circuit amplifies a difference in potential between a pair of input nodes and outputs the difference from an output node. A transfer transistor transfers charge from a photoelectric conversion element to a floating diffusion layer. A gate of a source follower transistor is connected to the floating diffusion layer, and a source (Continued)

thereof is connected to one of the pair of input nodes. A measurement unit measures a gate-source voltage of the source follower transistor and supplies a measured value. A correction arithmetic unit arithmetically calculates a correction value for correcting a potential of the other one of the pair of input nodes based on the measured value.

14 Claims, 21 Drawing Sheets

(51) Int. Cl.
*H04N 25/703* (2023.01)
*H04N 25/768* (2023.01)

(56) References Cited

OTHER PUBLICATIONS

Sakakibara, et al., "A 6.9-μm Pixel-Pitch Back-Illuminated Global Shutter CMOS Image Sensor With Pixel-Parallel 14-Bit Subthreshold ADC", IEEE Journal of Solid-State Circuits, vol. 53, No. 11, Sep. 5, 2018, pp. 3017-3025.

* cited by examiner

SOLID-STATE IMAGING ELEMENT, IMAGING DEVICE, AND METHOD OF CONTROLLING SOLID-STATE IMAGING ELEMENT FOR CORRECTING A POTENTIAL OF AN INPUT NODE OF A DIFFERENTIAL AMPLIFIER

CROSS REFERENCE TO RELATED APPLICATIONS

This application is a U.S. National Phase of International Patent Application No. PCT/JP2021/002568 filed on Jan. 26, 2021, which claims priority benefit of Japanese Patent Application No. JP 2020-050476 filed in the Japan Patent Office on Mar. 23, 2020. Each of the above-referenced applications is hereby incorporated herein by reference in its entirety.

TECHNICAL FIELD

The present technology relates to a solid-state imaging element and an imaging device. More specifically, the present technology relates to a solid-state imaging element in which an analog to digital converter (ADC) is provided for each pixel, an imaging device, and a method of controlling a solid-state imaging element.

BACKGROUND ART

Hitherto, a solid-state imaging element provided with an ADC for each pixel has been used for the purpose of imaging image data at high speed. For example, a solid-state imaging element has been proposed in which circuits provided with an ADC for each pixel are disposed to be distributed over two laminated chips (see, for example, NPL 1). In the solid-state imaging element, a floating diffusion layer in the pixel is connected to one of two input terminals of a differential amplifier circuit in the ADC, and a reference signal is input to the other input terminal.

CITATION LIST

Non Patent Literature

NPL 1

Masaki Sakakibara, et al., A 6.9-µm Pixel-Pitch Back-Illuminated Global Shutter CMOS Image Sensor With Pixel-Parallel 14-Bit Subthreshold ADC, IEEE Journal of Solid-State Circuits 2018.

SUMMARY

Technical Problem

In the above-described related art, circuits are disposed to be distributed into two laminated chips, thereby achieving functionality and miniaturization of pixels. However, in the above-described related art, a change in a reference signal is transmitted to a node of a floating diffusion layer through a parasitic capacitance in a differential amplifier circuit, which may result in a fluctuation in the potential of the node. The fluctuation in the potential delays a timing at which an output of the differential amplifier circuit is inverted, and there is a concern that the delay may reduce a frame rate.

The present technology is contrived in view of such circumstances, and object thereof is to improve a frame rate in a solid-state imaging element that compares a reference signal and a pixel signal with each other.

Solution to Problem

The present technology is contrived to solve the above-described problem, and a first aspect thereof is a solid-state imaging element including a differential amplifier circuit that amplifies a difference in potential between a pair of input nodes and outputs the difference from an output node, a transfer transistor that transfers charge from a photoelectric conversion element to a floating diffusion layer, a source follower transistor that is configured such that a gate is connected to the floating diffusion layer, and a source is connected to one of the pair of input nodes, a measurement unit that measures a gate-source voltage of the source follower transistor and supplies a measured value, and a correction arithmetic unit that arithmetically calculates a correction value for correcting a potential of the other one of the pair of input nodes based on the measured value. This provides an effect that a fluctuation in the potential of the floating diffusion layer is suppressed, and a frame rate is improved. In addition, this provides an effect that a variation in a gate-source voltage is corrected due to a correction value.

Further, in the first aspect, the solid-state imaging element may further include a short-circuit transistor that short-circuits the source and the gate of the source follower transistor in response to a predetermined control signal. The differential amplifier circuit, the transfer transistor, and the source follower transistor may be disposed in each of a valid pixel and a measurement pixel, the short-circuit transistor may be disposed in the measurement pixel, and the measurement unit may measure the gate-source voltage of the measurement pixel. This provides an effect that a variation in a gate-source voltage of a measurement pixel is corrected.

Further, in the first aspect, the measurement unit may measure the gate-source voltage every time a frame is imaged. This provides an effect that the accuracy of correction is improved.

Further, in the first aspect, the measurement unit may measure the gate-source voltage at the time of start-up. This provides an effect that a variation due to a fluctuation in temperature after chip inspection is corrected.

Further, in the first aspect, the measurement unit may measure the gate-source voltage at the time of chip inspection. This provides an effect that the amount of arithmetic operation is reduced.

Further, in the first aspect, the solid-state imaging element may further include a short-circuit transistor that short-circuits the source and the gate of the source follower transistor in response to a predetermined control signal. The differential amplifier circuit, the transfer transistor, the source follower transistor, and the short-circuit transistor may be disposed in a valid pixel, and the measurement unit may measure the gate-source voltage of the valid pixel. This provides an effect that a variation in a gate-source voltage of a valid pixel is corrected.

Further, in the first aspect, the measurement unit may measure the gate-source voltage at the time of start-up. This provides an effect that a variation due to a fluctuation in temperature after chip inspection is corrected.

Further, in the first aspect, the measurement unit may measure the gate-source voltage at the time of chip inspection. This provides an effect that the amount of arithmetic operation is reduced.

Further, in the first aspect, the measurement unit may measure, as the measured value, a difference between a digital signal corresponding to a signal output from the differential amplifier circuit when the source and the gate are short-circuited and a digital signal corresponding to a signal output from the differential amplifier circuit when the source and the gate are not short-circuited, and the correction arithmetic unit may arithmetically calculate a statistic of the measured value as the correction value. This provides an effect that the accuracy of correction is improved.

Further, in the first aspect, the solid-state imaging element may further include a delay time integration processing unit that performs time delay integration processing on a digital signal corresponding to a signal output from the differential amplifier circuit.

Further, in the first aspect, a portion of the differential amplifier circuit, the transfer transistor, and the source follower transistor may be provided in a predetermined light reception chip, and the rest of the differential amplifier circuit, the measurement unit, and the correction arithmetic unit may be provided in a predetermined circuit chip. This provides an effect that circuits are disposed to be distributed into a plurality of chips.

Further, in the first aspect, the light reception chip and the circuit chip may be connected to each other by a Cu—Cu junction. This provides an effect that chips are electrically connected to each other.

In addition, a second aspect of the present technology is an imaging device including a differential amplifier circuit that amplifies a difference in potential between a pair of input nodes and outputs the difference from an output node, a transfer transistor that transfers charge from a photoelectric conversion element to a floating diffusion layer, a source follower transistor that is configured such that a gate is connected to the floating diffusion layer, and a source is connected to one of the pair of input nodes, a measurement unit that measures a gate-source voltage of the source follower transistor and supplies a measured value, a correction arithmetic unit that arithmetically calculates a correction value for correcting the potential of the other one of the pair of input nodes based on the measured value, and a storage unit that stores a frame in which digital signals corresponding to signals output from the differential amplifier circuit are arranged. This provides an effect that a frame rate with an improved image quality is stored.

DESCRIPTION OF EMBODIMENTS

Figure 1:
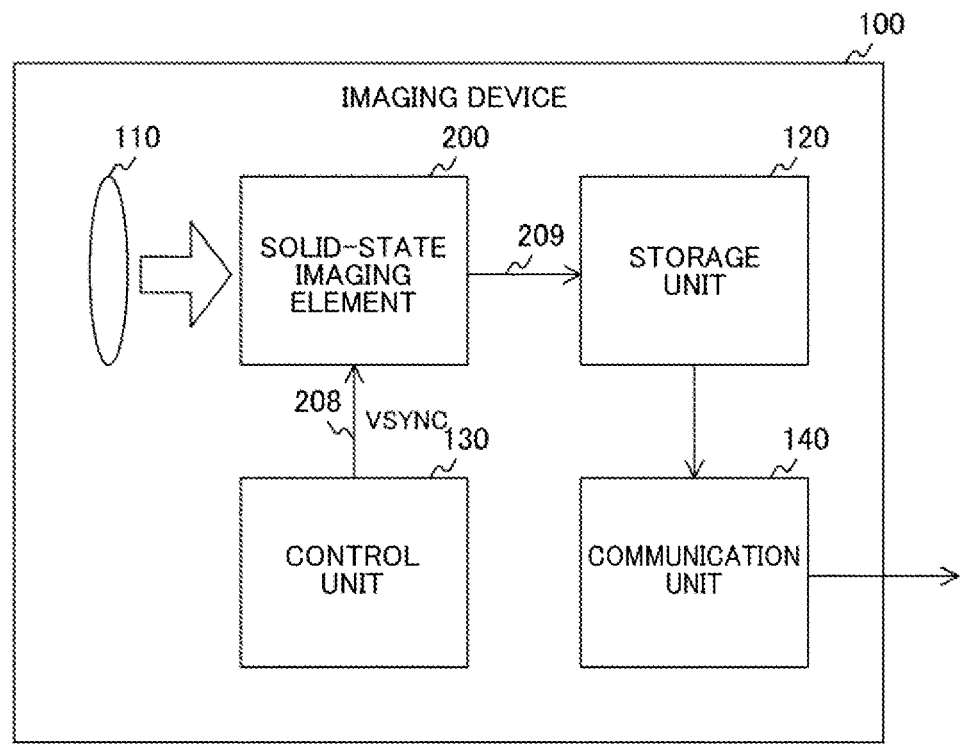
FIG. 1 is a block diagram illustrating a configuration example of an imaging device in a first embodiment of the present technology.

Modes for carrying out the present technology (hereinafter also referred to as "embodiments") will be described below. The description will be given in the following order.
1. First embodiment (example of correction performed based on measured value of gate-source voltage)
2. Second embodiment (example of addition of short-circuit transistor into valid pixel and correction performed based on measured value of gate-source voltage)
3. Example of application to moving body 1. First Embodiment Configuration Example of Imaging Device FIG. 1 is a block diagram illustrating a configuration example of an imaging device 100 in a first embodiment of the present technology. The imaging device 100, which is a device that captures image data, includes an optical unit 110, a solid-state imaging element 200, a storage unit 120, a control unit 130, and a communication unit 140.

The optical unit 110 condenses incident light and guides the light to the solid-state imaging element 200. The solid-state imaging element 200 captures image data. The solid-state imaging element 200 supplies the image data to the storage unit 120 via a signal line 209.

The storage unit 120 stores image data. The control unit 130 controls the solid-state imaging element 200 to capture the image data. The control unit 130 supplies a vertical synchronization signal VSYNC indicating an imaging timing to the solid-state imaging element 200 through, for example, a signal line 208.

The communication unit 140 reads the image data from the storage unit 120 and transmits the read image data to the outside.

Figure 2:
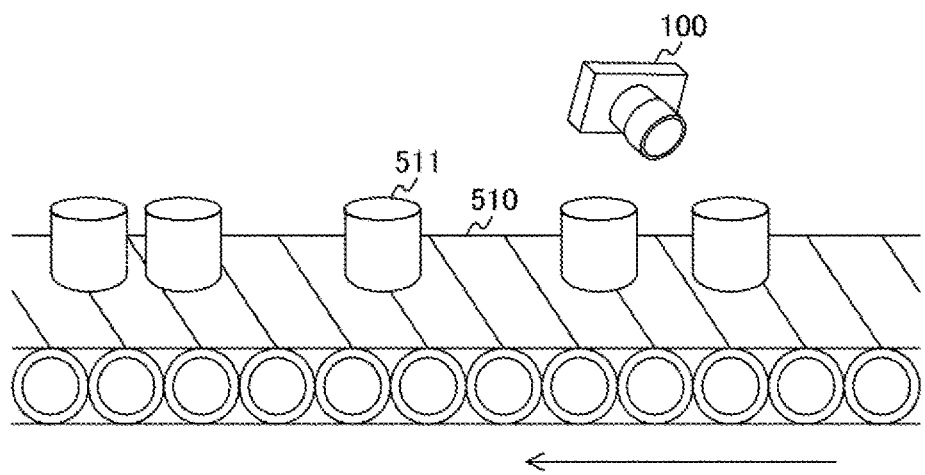
FIG. 2 is a diagram illustrating an example of use of an imaging system in the first embodiment of the present technology.

FIG. 2 is a diagram illustrating an example of use of the imaging device 100 in the first embodiment of the present technology. As illustrated in the drawing, the imaging device 100 is used in a factory or the like in which a belt conveyor 510 is provided.

The belt conveyor 510 moves a subject 511 in a predetermined direction at a constant speed. The imaging device 100, which is fixed to the vicinity of the belt conveyor 510, captures an image of the subject 511 to generate image data. The image data is used to inspect, for example, whether or not there is a defect. Thereby, factory automation (FA) is realized.

Note that the imaging device 100 captures an image of the subject 511 that moves at a constant speed, but is not limited to this configuration. A configuration, such as aerial photography, in which the imaging device 100 captures an image of the subject while moving at a constant speed may be adopted.

Configuration Example of Solid-State Imaging Element

Figure 3:
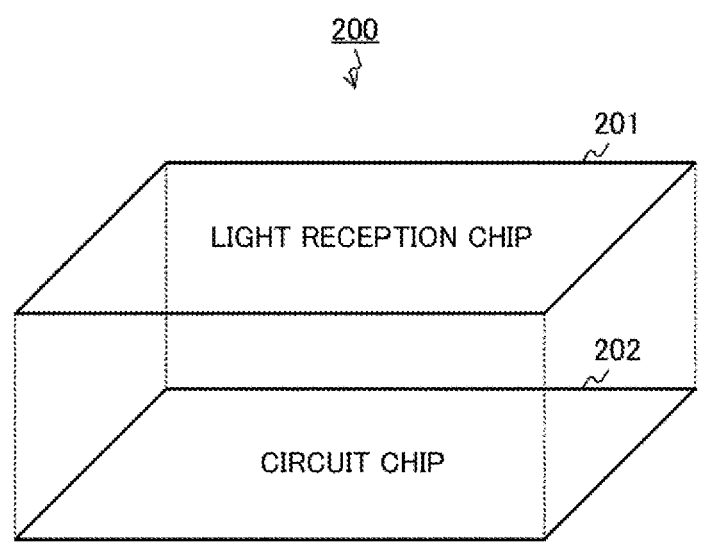
FIG. 3 is a diagram illustrating an example of a laminated structure of a solid-state imaging element in the first embodiment of the present technology.

FIG. 3 is a diagram illustrating an example of a laminated structure of the solid-state imaging element 200 in the first embodiment of the present technology. The solid-state imaging element 200 includes a circuit chip 202 and a light reception chip 201 laminated on the circuit chip 202. These chips are electrically connected to each other through a connection portion such as a via. In addition to the via, the chips can also be connected to each other by Cu—Cu junction or bumps.

Figure 4:
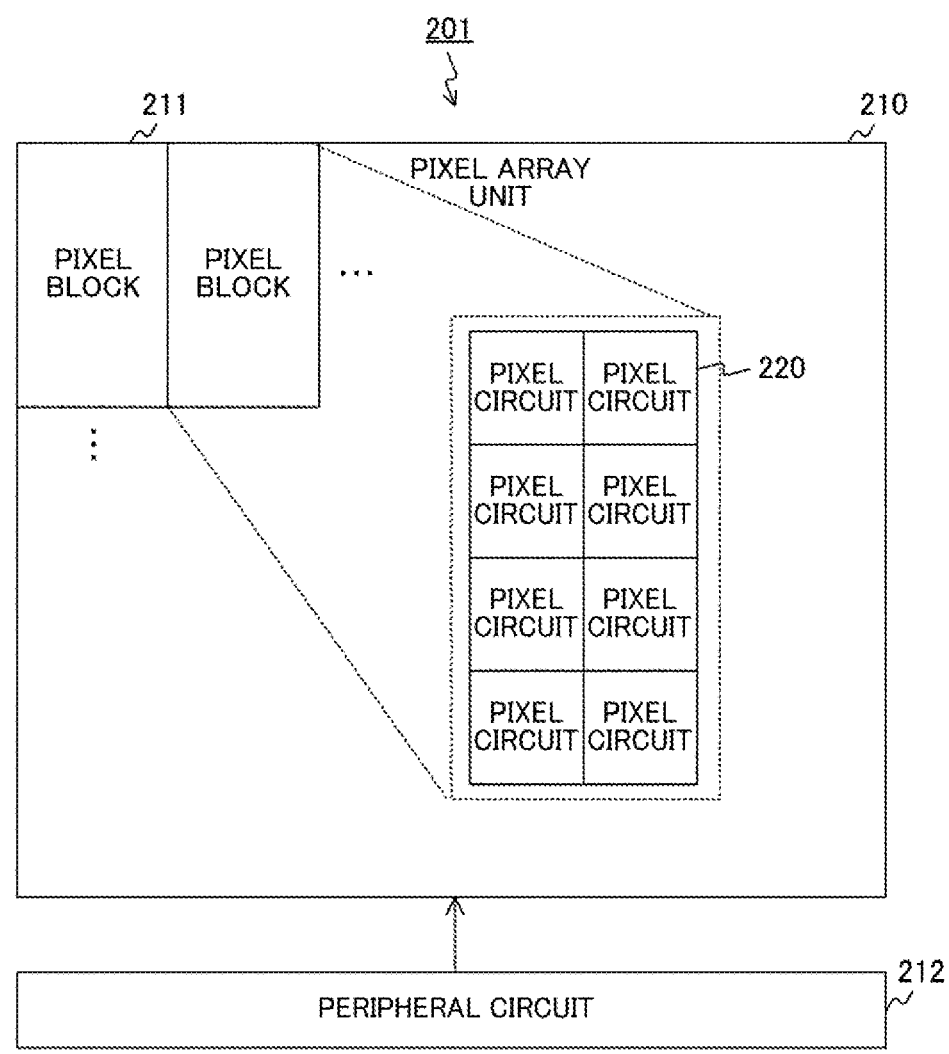
FIG. 4 is a block diagram illustrating a configuration example of a light reception chip in the first embodiment of the present technology.

FIG. 4 is a block diagram illustrating a configuration example of the light reception chip 201 in the first embodiment of the present technology. The light reception chip 201 is provided with a pixel array unit 210 and a peripheral circuit 212.

A plurality of pixel circuits 220 are arranged in a two-dimensional lattice pattern in the pixel array unit 210. In addition, the pixel array unit 210 is divided into a plurality of pixel blocks 211. In each of the pixel blocks 211, for example, pixel circuits 220 of 4 rows by 2 columns are arranged. In addition, a plurality of transistors are further disposed outside the pixel circuit 220 for each pixel circuit 220, but the transistors are omitted in the drawing for convenience of description.

In the peripheral circuit 212, for example, a circuit that supplies a direct current (DC) voltage, or the like is disposed.

Figure 5:
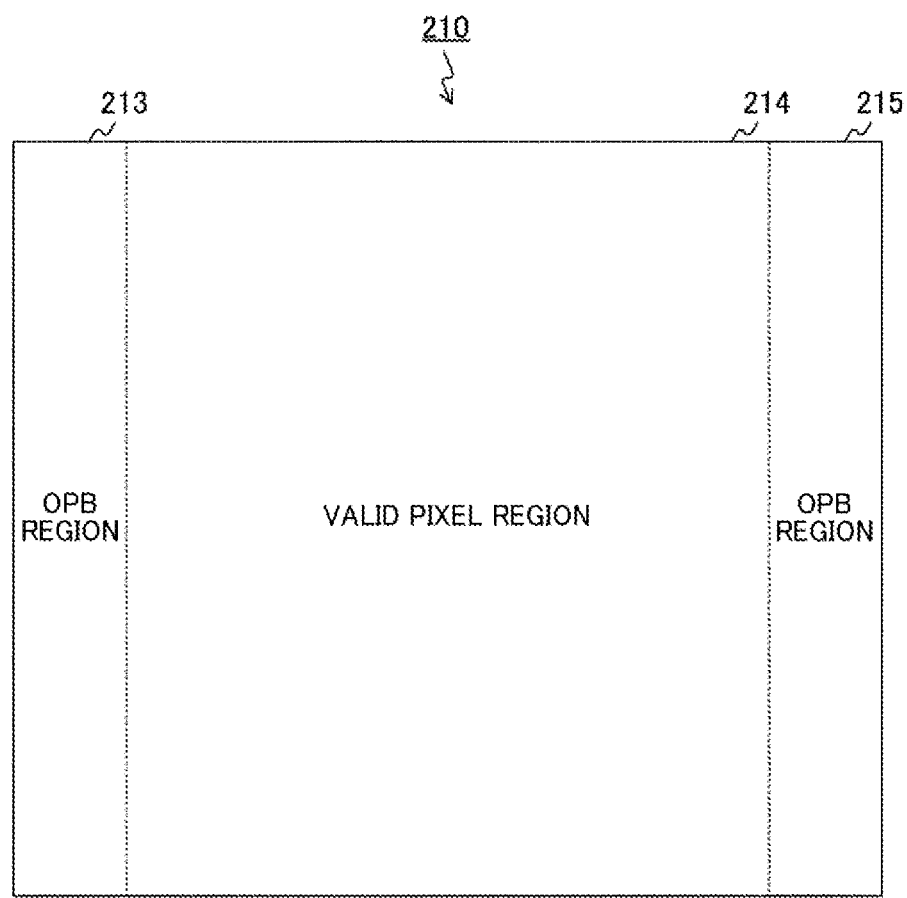
FIG. 5 is an example of a plan view of a pixel array unit in the first embodiment of the present technology.

FIG. 5 is an example of a plan view of the pixel array unit 210 in the first embodiment of the present technology. The pixel array unit 210 is divided into a valid pixel region 214 in which light is not shielded, and optical black (OPB) regions 213 and 215 in which light is shielded.

In the valid pixel region 214, a plurality of valid pixels are arranged in a two-dimensional lattice shape. The valid pixels perform photoelectric conversion of incident light to generate a pixel signal. In each of the OPB regions 213 and 215, a predetermined number of light-shielding pixels are arranged. Some of the light-shielding pixels are also used to measure a gate-source voltage to be described later. Among the light-shielding pixels, pixels used to measure a gate-source voltage are referred to as "measurement pixels" below. For example, the OPB region 213 is disposed on the left side of the valid pixel region 214, and the OPB region 215 is disposed on the right side of the valid pixel region 214. In addition, at least one measurement pixel is disposed for each row. It is preferable that a measurement pixel be provided on each of the left side and the right side for each valid pixel.

Note that, although the OPB regions 213 and 215 are disposed on the right and left sides of the valid pixel region 214, the OPB regions may be disposed on the upper and lower sides of the valid pixel region 214. In addition, the OPB regions may be disposed on the upper, lower, right, and left sides of the valid pixel region 214.

Figure 6:
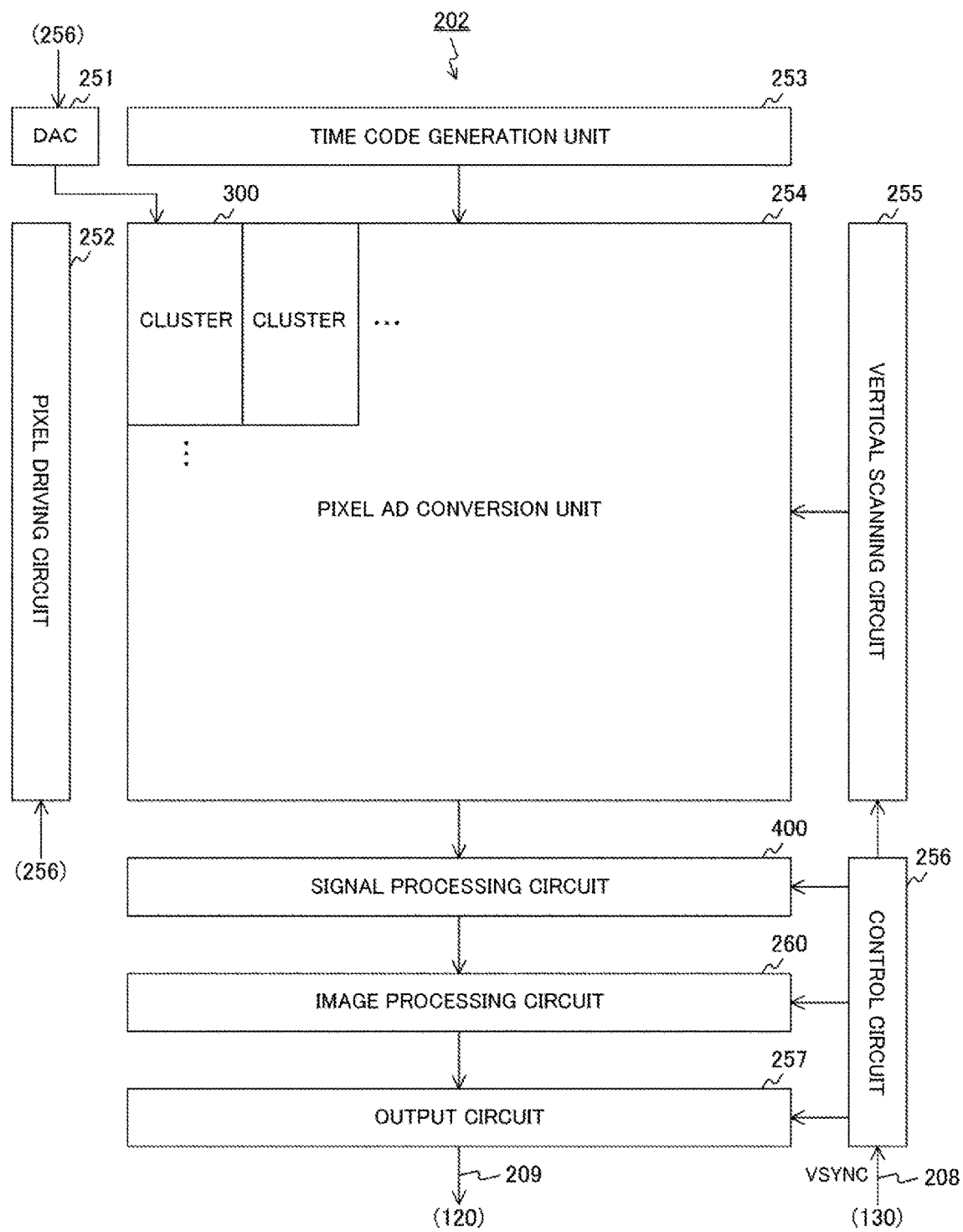
FIG. 6 is a block diagram illustrating a configuration example of a circuit chip in the first embodiment of the present technology.

FIG. 6 is a block diagram illustrating a configuration example of the circuit chip 202 in the first embodiment of the present technology. In the circuit chip 202, a digital to analog converter (DAC) 251, a pixel driving circuit 252, a time code generation unit 253, a pixel AD conversion unit 254, and a vertical scanning circuit 255 are disposed. Further, in the circuit chip 202, a control circuit 256, a signal processing circuit 400, an image processing circuit 260, and an output circuit 257 are disposed.

The DAC 251 is generated by performing digital to analog (DA) conversion of a reference signal within a predetermined AD conversion period. For example, a ramp signal having a sawtooth shape is used as the reference signal. The DAC 251 supplies the reference signal to the pixel AD conversion unit 254.

The time code generation unit 253 generates a time code indicating the time within an AD conversion period. The time code generation unit 253 is realized by, for example, a counter. As the counter, for example, a gray code counter is used. The time code generation unit 253 supplies a time code to the pixel AD conversion unit 254.

The pixel driving circuit 252 drives each of the pixel circuits 220 to generate an analog pixel signal.

The pixel AD conversion unit 254 performs AD conversion for converting an analog signal (that is, a pixel signal) of each of the pixel circuits 220 into a digital signal. The pixel AD conversion unit 254 is divided into a plurality of clusters 300. The cluster 300 is provided for each pixel block 211 and converts an analog signal in the pixel block 211 into a digital signal.

The pixel AD conversion unit 254 generates image data in which digital signals are arranged by AD conversion as a frame and supplies the generated frame to the signal processing circuit 400.

The vertical scanning circuit 255 drives the pixel AD conversion unit 254 to execute AD conversion.

The signal processing circuit 400 performs predetermined signal processing on a frame. As the signal processing, various kinds of processing including correlated double sampling (CDS) processing are executed. The signal processing circuit 400 supplies the processed frame to the image processing circuit 260.

The image processing circuit 260 executes predetermined image processing on the frame supplied from the signal processing circuit 400. As the image processing, image recognition processing, black level correction processing, image correction processing, demosaic processing, or the like are executed. The image processing circuit 260 supplies the processed frame to the output circuit 257.

The output circuit 257 outputs the frame having been subjected to the image processing to the outside.

The control circuit 256 controls an operation timing of each of the DAC 251, the pixel driving circuit 252, the vertical scanning circuit 255, the signal processing circuit 400, the image processing circuit 260, and the output circuit 257 in synchronization with a vertical synchronization signal VSYNC.

Configuration Example of Pixel AD Conversion Unit

Figure 7:
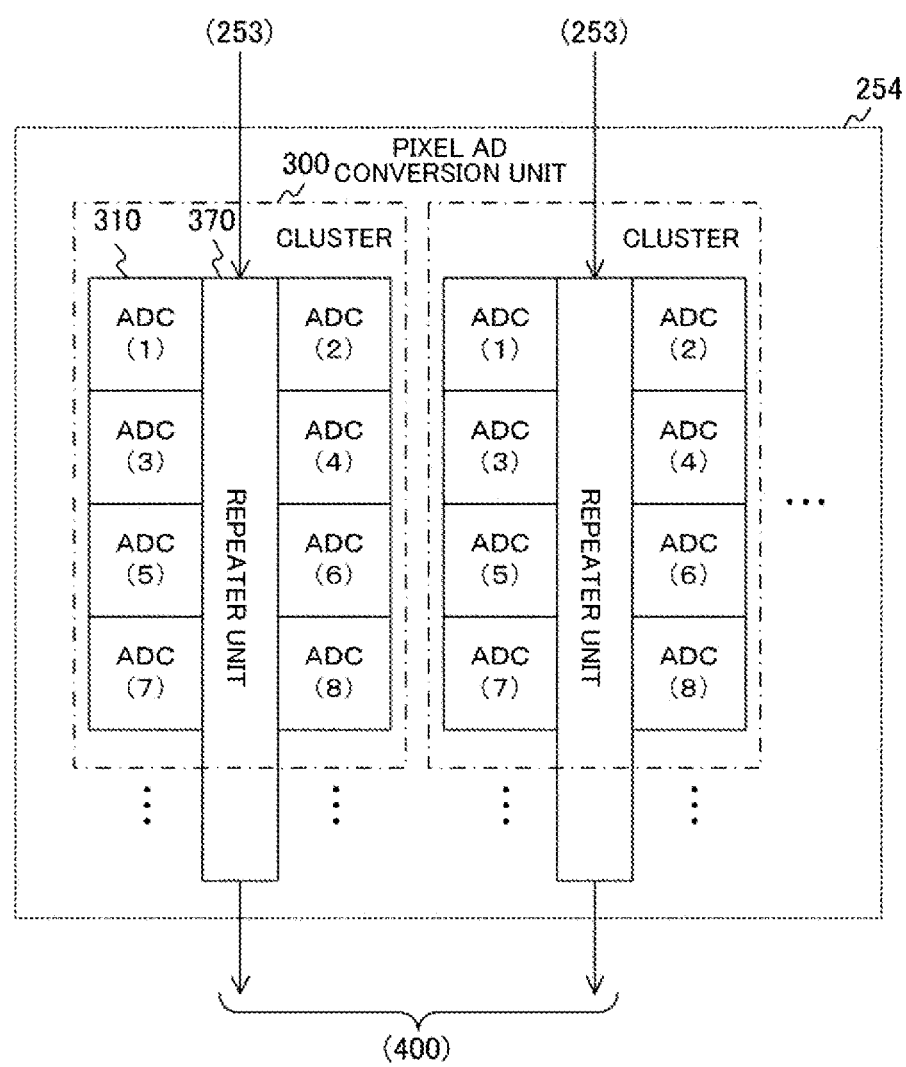
FIG. 7 is a diagram illustrating a configuration example of a pixel analog to digital (AD) conversion unit in the first embodiment of the present technology.

FIG. 7 is a diagram illustrating a configuration example of the pixel AD conversion unit 254 in the first embodiment of the present technology. In the pixel AD conversion unit 254, a plurality of ADCs 310 are arranged in a two-dimensional lattice shape. The ADC 310 is disposed for each pixel circuit 220. In a case where the number of rows and the number of columns of the pixel circuit 220 are N rows (N is an integer) and M columns (M is an integer), respectively, N×M ADCs 310 are disposed.

The same number of ADCs 310 as the number of pixel circuits 220 in the pixel block 211 are disposed in each of the clusters 300. In a case where the pixel circuits 220 of 4 rows by 2 columns are arranged in the pixel block 211, the ADCs 310 of 4 rows by 2 columns are also arranged in the cluster 300.

The ADC 310 performs AD conversion on an analog pixel signal generated by the corresponding pixel circuit 220. The ADC 310 compares a pixel signal and a reference signal with each other in AD conversion and holds a time code when a comparison result thereof is inverted. In addition, the ADC 310 outputs the held time code as a digital signal after AD conversion.

In addition, a repeater unit 370 is disposed for each column of the cluster 300. In a case where the number of columns of the cluster 300 is M/2, M/2 repeater units 370 are disposed. The repeater unit 370 transfers a time code. The repeater unit 370 transfers a time code from the time code generation unit 253 to the ADC 310. In addition, the repeater unit 370 transfers a digital signal from the ADC 310 to the signal processing circuit 400. The transfer of the digital signal is also referred to as "reading" of the digital signal.

Further, in the drawing, a number in parentheses indicates an example of the order of reading of digital signals of the ADC 310. For example, a digital signal in an odd-numbered column of a first row is read first, and a digital signal in an even-numbered column of the first row is read second. A digital signal in an odd-numbered column of a second row is read third, and a digital signal in an even-numbered column of the second row is read third. Hereinafter, similarly, digital signals in an odd-numbered column and an even-numbered column of each row are read in order.

Note that, the ADC 310 is disposed for each pixel circuit 220, but is not limited to this configuration. The plurality of pixel circuits 220 may be configured to share one ADC 310.

Configuration Example of ADC

Figure 8:
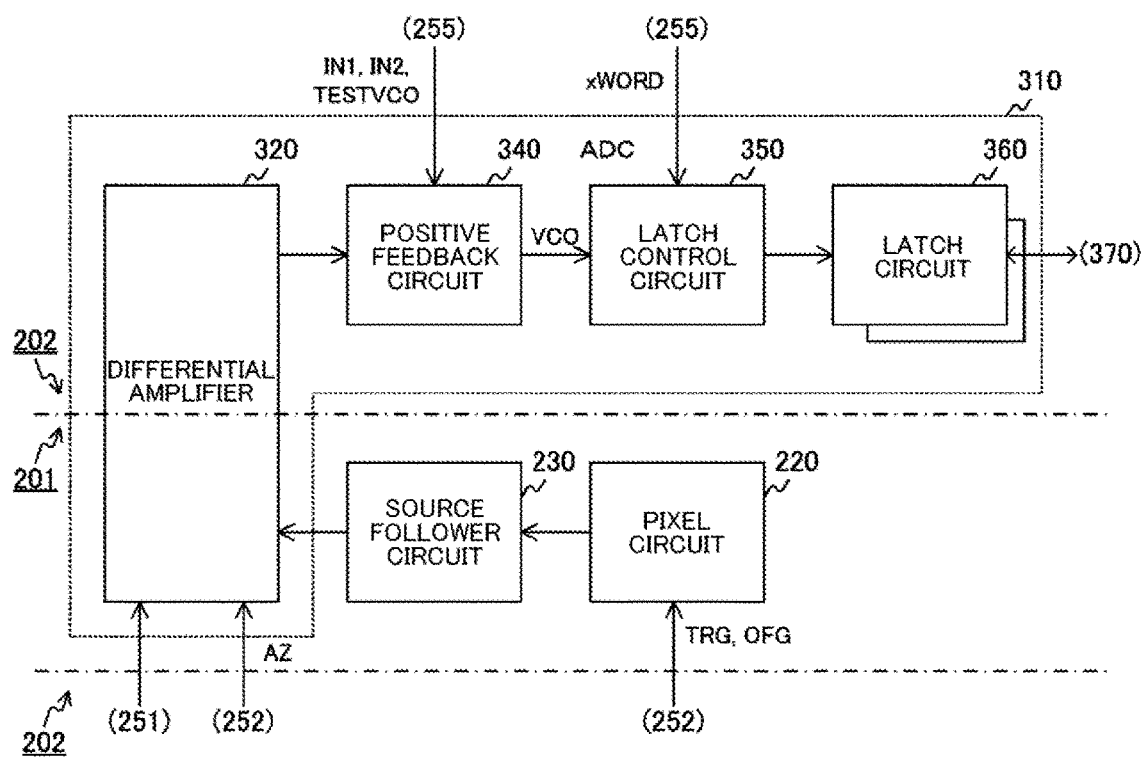
FIG. 8 is a block diagram illustrating a configuration example of a valid pixel and an ADC in the first embodiment of the present technology.

FIG. 8 is a block diagram illustrating configuration examples of a valid pixel and the ADC 310 in the first embodiment of the present technology. The ADC 310 includes a differential amplifier 320, a positive feedback circuit 340, a latch control circuit 350, and a plurality of latch circuits 360.

In addition, a source follower circuit 230 is disposed between the pixel circuit 220 and the ADC 310. The source follower circuit 230 supplies a signal at a potential $V_{SOUT}$ to the ADC 310 in accordance with potential $V_{SIN}$ of a pixel signal from the pixel circuit 220. A circuit constituted by the pixel circuit 220 and the source follower circuit 230 functions as one valid pixel.

In addition, the pixel circuit 220 and the source follower circuit 230 and a portion of the differential amplifier 320 are disposed in the light reception chip 201, and the rest of the differential amplifier 320 and a circuit in a latter stage are disposed in the circuit chip 202.

The differential amplifier 320 compares a pixel signal from the source follower circuit 230 and a reference signal from the DAC 251. The differential amplifier 320 supplies a comparison result signal indicating a comparison result to the positive feedback circuit 340.

The positive feedback circuit 340 adds a portion of an output to an input (comparison result signal) and supplies the resultant to the latch control circuit 350 as an output signal VCO.

The latch control circuit 350 holds a time code when the output signal VCO is inverted in the plurality of latch circuits 360 in accordance with a control signal xWORD from the vertical scanning circuit 255.

The latch circuit 360 holds a time code from the repeater unit 370 under the control of the latch control circuit 350. The latch circuits 360 are provided for the number of bits of the time code. For example, in a case where the time code is 15 bits, 15 latch circuits 360 are disposed in the ADC 310. In addition, the held time code is read by the repeater unit 370 as a digital signal having been subjected to AD conversion.

According to the configuration illustrated in the drawing, the ADC 310 converts a pixel signal from the source follower circuit 230 into a digital signal.

Configuration Examples of Differential Amplifier and Positive Feedback Circuit

Figure 9:
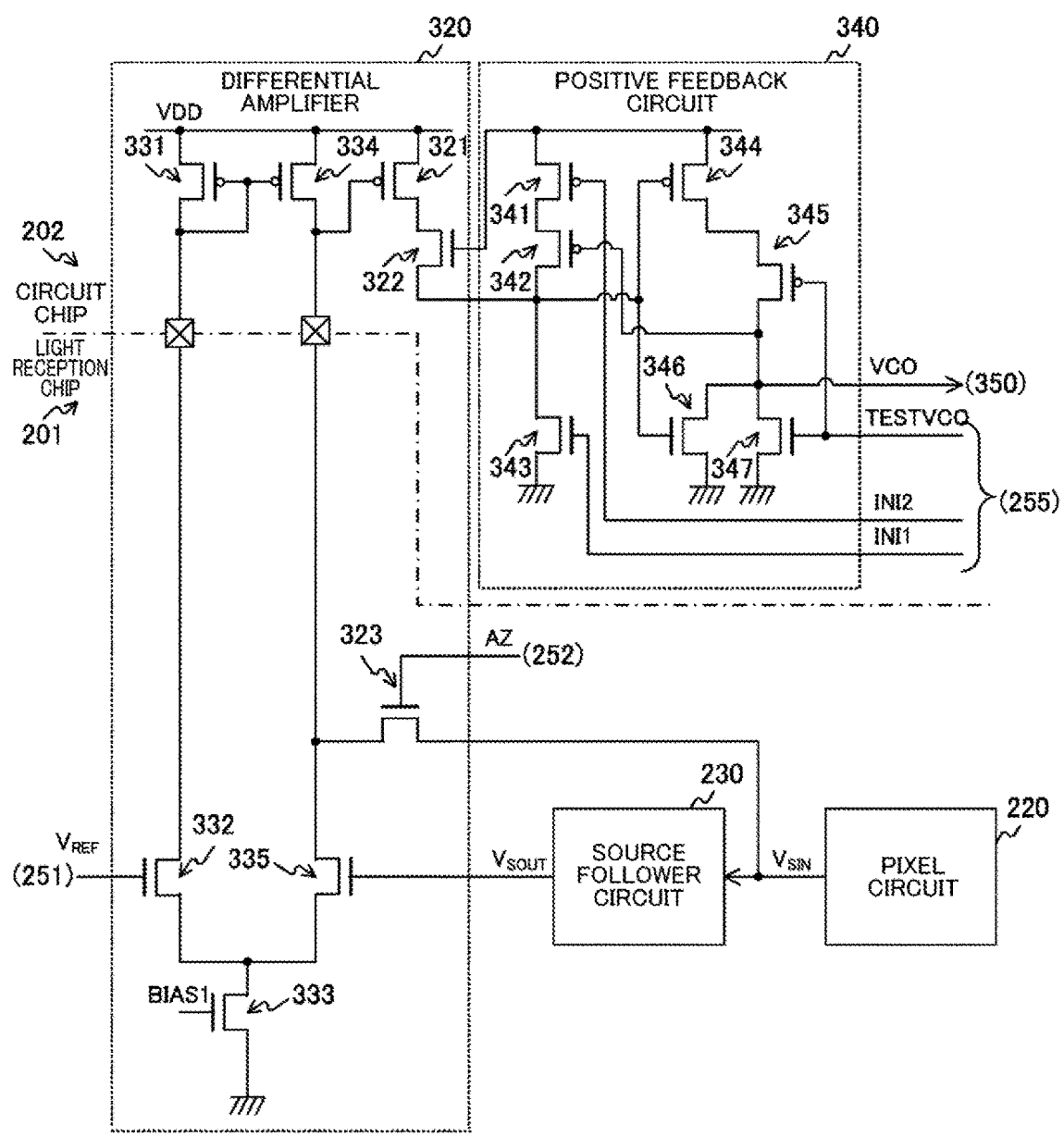
FIG. 9 is a circuit diagram illustrating configuration examples of a differential amplifier and a positive feedback circuit in the first embodiment of the present technology.

FIG. 9 is a circuit diagram illustrating configuration examples of the pixel circuit 220, the differential amplifier 320, and the positive feedback circuit 340 in the first embodiment of the present technology.

The differential amplifier 320 includes p-channel metal oxide semiconductor (pMOS) transistors 331, 334, and 321. In addition, the differential amplifier 320 includes an n-channel MOS (nMOS) transistor 322, an auto-zero transistor 323, differential transistors 332 and 335, and a current source transistor 333. Among these, the auto-zero transistor 323, the differential transistors 332 and 335, and the current source transistor 333 are disposed in the light reception chip 201, and the remaining transistors are disposed in the circuit chip 202. As the differential transistors 332 and 335, for example, an nMOS transistor is used. In addition, as the auto-zero transistor 323 and the current source transistor 333, for example, an nMOS transistor is used.

The differential transistors 332 and 335 constitute a differential pair, and the sources of these transistors are commonly connected to the drain of the current source transistor 333. In addition, the drain of the differential transistor 332 is connected to the drain of the pMOS transistor 331 and the gates of the pMOS transistors 331 and 334. The drain of the differential transistor 335 is connected to the drain of the pMOS transistor 334 and the gate of the pMOS transistor 321. In addition, a reference signal from the DAC 251 is input to the gate of the differential transistor 332. The potential of the reference signal is set to be $V_{REF}$.

A predetermined bias voltage BIAS1 is applied to the gate of the current source transistor 333, and a predetermined ground voltage is applied to the source of the current source transistor 333. The current source transistor 333 supplies a current corresponding to the bias voltage BIAS1.

A pixel signal from the source follower circuit 230 is input to the gate of the differential transistor 335. The potential of the pixel signal is set to be $V_{SOUT}$.

The pMOS transistors 331, 334, and 321 constitute a current mirror circuit. A power supply voltage VDD is applied to the sources of the pMOS transistors 331, 334, and 321.

The drain of the nMOS transistor 322 is connected to the drain of the pMOS transistor 321, and the source thereof is connected to the positive feedback circuit 340.

The auto-zero transistor 323 short-circuits the drain of the differential transistor 335 and an input node of the source follower circuit 230 in accordance with an auto-zero signal AZ from the pixel driving circuit 252.

The positive feedback circuit 340 includes pMOS transistors 341, 342, 344, and 345 and nMOS transistors 343, 346, and 347. The pMOS transistors 341 and 342 and the nMOS transistor 343 are connected to the gate of the nMOS transistor 322 in series. In addition, a driving signal INI2 from the vertical scanning circuit 255 is input to the gate of the pMOS transistor 341. A connection point between the pMOS transistor 342 and the nMOS transistor 343 is connected to the source of the nMOS transistor 322.

A ground voltage is applied to the source of the nMOS transistor 343, and a driving signal INI1 from the vertical scanning circuit 255 is input to the gate thereof.

The pMOS transistors 344 and 345 are connected to the gate of the nMOS transistor 322 in series. In addition, the drain of the pMOS transistor 345 is connected to the gate of the pMOS transistor 342 and the drains of the nMOS transistors 346 and 347. A control signal TESTVCO from the vertical scanning circuit 255 is input to the gates of the pMOS transistor 345 and the nMOS transistor 347. In addition, the gates of the pMOS transistor 344 and the nMOS transistor 346 are connected to a connection point between the pMOS transistor 342 and the nMOS transistor 343.

An output signal VCO is output from a connection point between the pMOS transistor 345 and the nMOS transistor 347. In addition, a ground voltage is applied to the sources of the nMOS transistors 346 and 347.

Note that the differential amplifier 320 and the positive feedback circuit 340 are not limited to the circuits illustrated in FIG. 8 as long as they have the functions described in FIG. 7.

Figure 10:
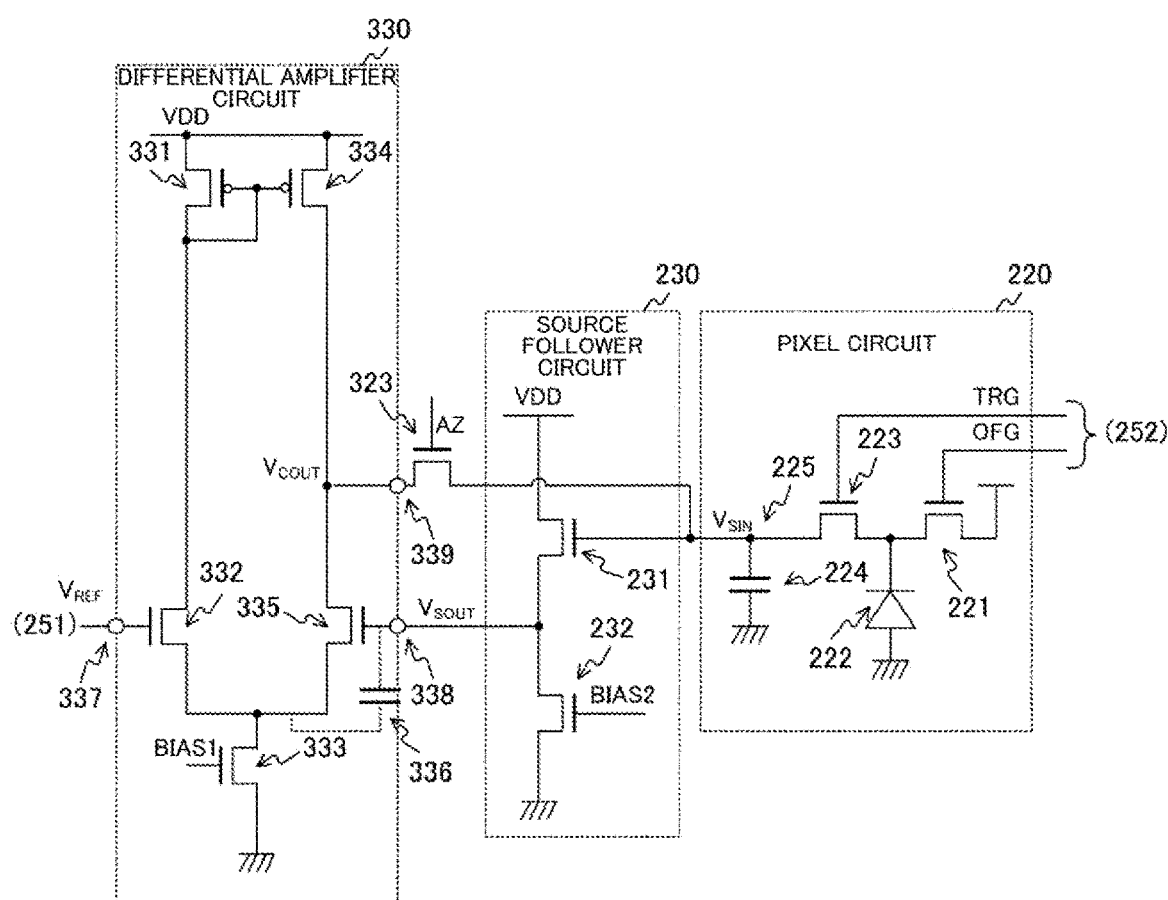
FIG. 10 is a circuit diagram illustrating configuration examples of a source follower circuit and a pixel circuit in a valid pixel in the first embodiment of the present technology.

FIG. 10 is a circuit diagram illustrating configuration examples of the source follower circuit 230 and the pixel circuit 220 in a valid pixel in the first embodiment of the present technology. The pixel circuit 220 includes a discharge transistor 221, a photoelectric conversion element 222, a transfer transistor 223, and a floating diffusion layer 224. The source follower circuit 230 includes a source follower transistor 231 and a current source transistor 232. As the discharge transistor 221, the transfer transistor 223, the source follower transistor 231, and the current source transistor 232, for example, an nMOS transistor is used.

The discharge transistor 221 discharges charge accumulated in the photoelectric conversion element 222 in response to a driving signal OFG from the pixel driving circuit 252. The photoelectric conversion element 222 generates charge by photoelectric conversion.

The transfer transistor 223 transfers charge from the photoelectric conversion element 222 to the floating diffusion layer 224 in response to a transfer signal TRG from the pixel driving circuit 252.

The floating diffusion layer 224 accumulates the transferred charge to generate a voltage corresponding to the amount of charge. A node of the floating diffusion layer 224 on the transfer transistor 223 side is set to be a floating diffusion layer node 225, and the potential thereof is set to be $V_{SIN}$.

The gate of the source follower transistor 231 is connected to the floating diffusion layer node 225 of the floating diffusion layer 224. In addition, the source of the source follower transistor 231 is connected to the drain of the current source transistor 232.

A predetermined bias voltage BIAS2 is applied to the gate of the current source transistor 232, and a predetermined ground voltage is applied to the source thereof. The current source transistor 232 supplies a current corresponding to the bias voltage BIAS2.

In addition, a connection node (that is, the source of the source follower transistor 231) between the source follower transistor 231 and the current source transistor 232 is connected to the gate of the differential transistor 335.

When a gate-source voltage of the source follower transistor 231 is set to be $V_{GS}$, the following expression is established between a potential $V_{SIN}$ of the gate of the source follower transistor 231 and a potential $V_{SOUT}$ of the source thereof.

$$V_{SIN} = V_{SOUT} + V_{GS} \quad \text{(Expression 1)}$$

From Expression 1, the potential $V_{SOUT}$ of the source of the source follower transistor 231 fluctuates in compliance with the potential $V_{SIN}$ of the gate thereof.

In addition, a circuit constituted by the pMOS transistors 331 and 334 in the differential amplifier 320, the differential transistors 332 and 335, and the current source transistor 333 functions as a differential amplifier circuit 330.

The gate of the differential transistor 332 having a potential $V_{REF}$ corresponds to an input node 337 of the differential amplifier circuit 330. The gate of the differential transistor 335 having a potential $V_{SOUT}$ corresponds to an input node 338 of the differential amplifier circuit 330. The drain of the differential transistor 335 corresponds to an output node 339 of the differential amplifier circuit 330. The potential of the output node is set to be $V_{COUT}$. In addition, it is assumed that a parasitic capacitance 336 is generated between the gate and the source of the differential transistor 335.

The differential amplifier circuit 330 amplifies a difference between the potential $V_{REF}$ of the input node 337 and the potential $V_{SOUT}$ of the input node 338 and outputs the amplified difference from the output node 339.

The auto-zero transistor 323 short-circuits the output node 339 of the differential amplifier circuit 330 and the floating diffusion layer node 225 (in other words, the input node of the source follower circuit 230) in response to the auto-zero signal AZ.

Here, a first comparative example of a configuration in which the floating diffusion layer node 225 is directly connected to the gate (that is, the input node 338) of the differential transistor 335 without providing the source follower circuit 230 is assumed. In the first comparative example, the floating diffusion layer node 225 of high impedance is directly connected to the input node 338 of the differential amplifier circuit 330, and thus a change in a reference signal is propagated to the floating diffusion layer node 225 via the parasitic capacitance 336 of the differential transistor 335. For example, when the reference signal is decreased in a slope shape, the potential $V_{SIN}$ of the floating diffusion layer node 225 is also reduced in association with the decrease in the reference signal. For this reason, an error occurs in the value of the potential $V_{REF}$ when it matches the potential $V_{SIN}$, and a propagation delay time of the differential amplifier circuit 330 greatly increases. Examples of factors of an increase in the propagation delay time include a timing at which the potential $V_{SIN}$ and the potential $V_{REF}$ match being delayed from the original timing due to a reduction in the potential $V_{SIN}$, and a decrease in the speed at which a difference between the input nodes of the differential amplifier circuit 330 increases even after the potential $V_{SIN}$ and the potential $V_{REF}$ match.

Out of the error of the potential and the increase in the propagation delay time, the error can be removed by CDS processing, but the increase in the propagation delay time cannot be eliminated by the CDS processing. When a propagation delay time increases, an AD conversion time of the ADC 310 increases, and a frame rate is reduced.

When the capacity of the floating diffusion layer 224 is increased, a fluctuation in the potential $V_{SIN}$ can be suppressed, but the capacity of the floating diffusion layer 224 is increased, the efficiency of charge voltage conversion of the floating diffusion layer 224 is reduced, which leads to an undesirable result.

In this manner, in a case where the floating diffusion layer node 225 is directly connected to the gate of the differential transistor 335, there is a concern that a frame rate may be reduced.

On the other hand, in the circuit provided with the source follower circuit 230 which is illustrated in the drawing, the potential $V_{SOUT}$ fluctuates in compliance with the potential $V_{SIN}$ as shown in Expression 1. In addition, when the auto-zero transistor 323 is in an off-state, the impedance of the potential $V_{SIN}$ decreases by the source follower circuit 230, and thus the potential $V_{SIN}$ does not fluctuate even when the reference signal is decreased in a slope shape. For this reason, it is possible to prevent the potential $V_{SIN}$ from fluctuating due to the fluctuation in the potential $V_{REF}$. Thereby, it is possible to reduce an AD conversion time and improve a frame rate. In particular, in a case where time delayed integration (TDI) processing is performed, an extremely high frame rate (for example, 200 to 300 kHz or the like) is required, and thus it becomes easy to respond to such a request by adding the source follower circuit 230.

Further, in a configuration in which the source follower circuit 230 is provided, a propagation delay time is not increased even when impedance is increased by reducing the capacity of the floating diffusion layer 224. For this reason, it is possible to reduce the capacity of the floating diffusion layer 224 while maintaining a frame rate and to increase the efficiency of charge voltage conversion.

Next, a second comparative example in which the source follower circuit 230 is provided, an auto-zero capacitance is inserted between the source follower circuit 230 and the gate of the differential transistor 335, and an auto-zero transistor short-circuits the gate and the drain of the differential transistor 335 is assumed. The second comparative example is described in, for example, Japanese Patent Application No. 2016-545441. In the second comparative example, it is possible to prevent the potential $V_{SIN}$ of the floating diffusion layer node 225 from being associated with a reference signal. However, a gain from a connection node (an output of a source follower) between the source follower transistor 231 and the current source transistor 232 to the gate of the differential transistor 335 is determined by the auto-zero capacitance and the parasitic capacitance 336 and is expressed by the following expression.

$$C_{AZ}/(C_{AZ}+C_{gs})$$

In the above expression, $C_{AZ}$ indicates a capacitance value of an auto-zero capacitance, and $C_{gs}$ indicates a capacitance value of the parasitic capacitance 336.

When $C_{AZ}$ and $C_{gs}$ are fixed values, the gains thereof are fixed only by attenuation, but $C_{gs}$ is not a fixed value and has bias dependence, and thus the gain thereof also changes and linearity deteriorates when a voltage of the gate of the differential transistor 335 changes.

When $C_{AZ}$ is extremely larger than $C_{gs}$, the deterioration of linearity can be suppressed, but auto-zero capacitance needs to be disposed in a pixel, and thus only an auto-zero capacitance having a small capacitance value (approximately several femto farads) can be placed. This is only several times to ten times the value of $C_{gs}$. On the other hand, $C_{gs}$ has bias dependence of several percent, and thus a gain fluctuation also occurs by approximately several percent. This fluctuation is an unacceptable value.

In addition, since a ratio between $C_{AZ}$ and $C_{gs}$ is small, an absolute value of a gain is also decreased, and noise converted into an input of the floating diffusion layer 224 deteriorates.

In this manner, in the second comparative example, the problem in the first comparative example can be solved, but there are adverse effects such as deterioration of linearity and an increase in noise.

On the other hand, in a configuration in which the auto-zero transistor 323 short-circuits the drain of the differential transistor 335 and the input node of the source follower circuit 230, an auto-zero capacitance is not necessary. Thereby, it is possible to suppress deterioration of linearity and noise.

Figure 11A:
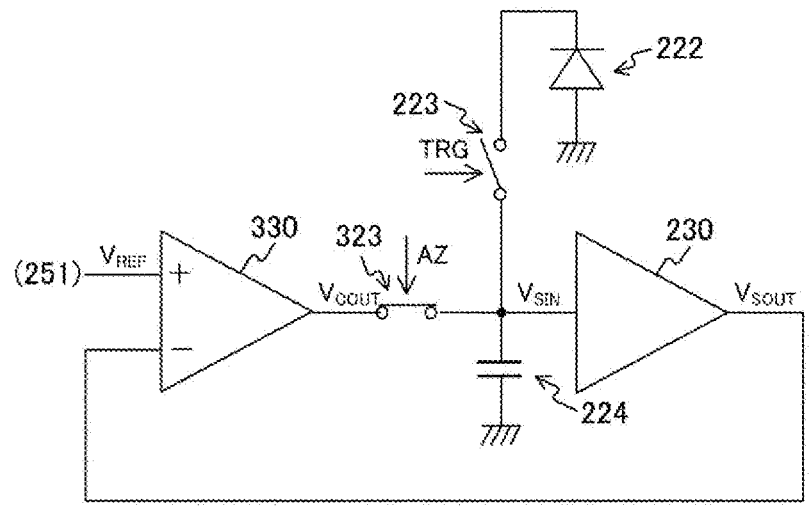
FIGS. 11A and 11B are diagrams illustrating a method of controlling a transistor in a valid pixel in the first embodiment of the present technology.
Figure 11B:
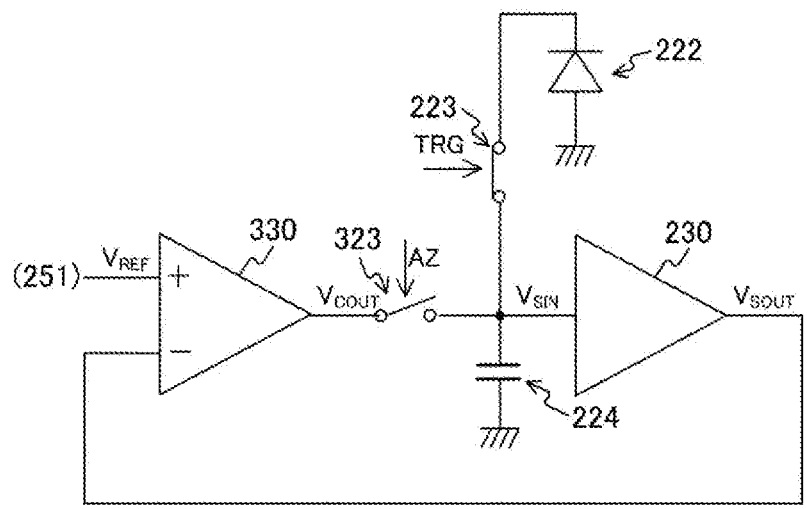

FIGS. 11A and 11B are diagrams illustrating a method of controlling a transistor in a valid pixel in the first embodiment of the present technology. FIG. 11A in the drawing indicates a method of controlling a transistor at the time of auto-zero, and FIG. 11B in the drawing indicates a method of controlling a transistor after auto-zero.

Further, in the drawing, the differential amplifier circuit 330 is represented by a graphic symbol of a comparator, and the source follower circuit 230 is represented by a graphic symbol of a voltage buffer. The auto-zero transistor 323 and the transfer transistor 223 are represented by graphic symbols of switches.

As illustrated in FIG. 11A in the drawing, the pixel driving circuit 252 sets the auto-zero transistor 323 to be in an on-state and sets the transfer transistor 223 to be in an off-state, prior to a comparison operation of the comparator (differential amplifier circuit 330). Thereby, it is possible to short-circuit an output node of the comparator (differential amplifier circuit 330) and the input node of the source follower circuit 230 and match the zero of a reference signal and the zero of a pixel signal (that is, auto-zero) by applying feed-back. The potential VSIN at this time is set to zero of the pixel signal. In addition, a potential VSOUT corresponding to the potential VSIN is output from the source follower circuit 230 according to Expression 1.

As illustrated in FIG. 11B in the drawing, the pixel driving circuit 252 sets the auto-zero transistor 323 to be in an off-state after auto-zero. The DAC 251 changes a reference signal to a slope shape, and the ADC 310 converts an analog pixel signal corresponding to the potential of the initialized floating diffusion layer 224 into a digital signal. The level of the pixel signal at this time is referred to as a P phase or a reset level.

After the P-phase conversion, the pixel driving circuit 252 sets the transfer transistor 223 to be in an on-state and transfers charge from the photoelectric conversion element 222 to the floating diffusion layer 224. The DAC 251 changes a reference signal to a slope shape, and the ADC 310 converts an analog pixel signal corresponding to the potential of the floating diffusion layer 224 after the transfer into a digital signal. The level of the pixel signal at this time is referred to as a D phase or a signal level.

In FIG. 11B in the drawing, the impedance of the potential VSOUT is decreased by the source follower circuit 230, and thus the potential VSIN does not fluctuate even when a reference signal is decreased in a slope shape at the time of the P-phase and D-phase conversion.

Figure 12A:
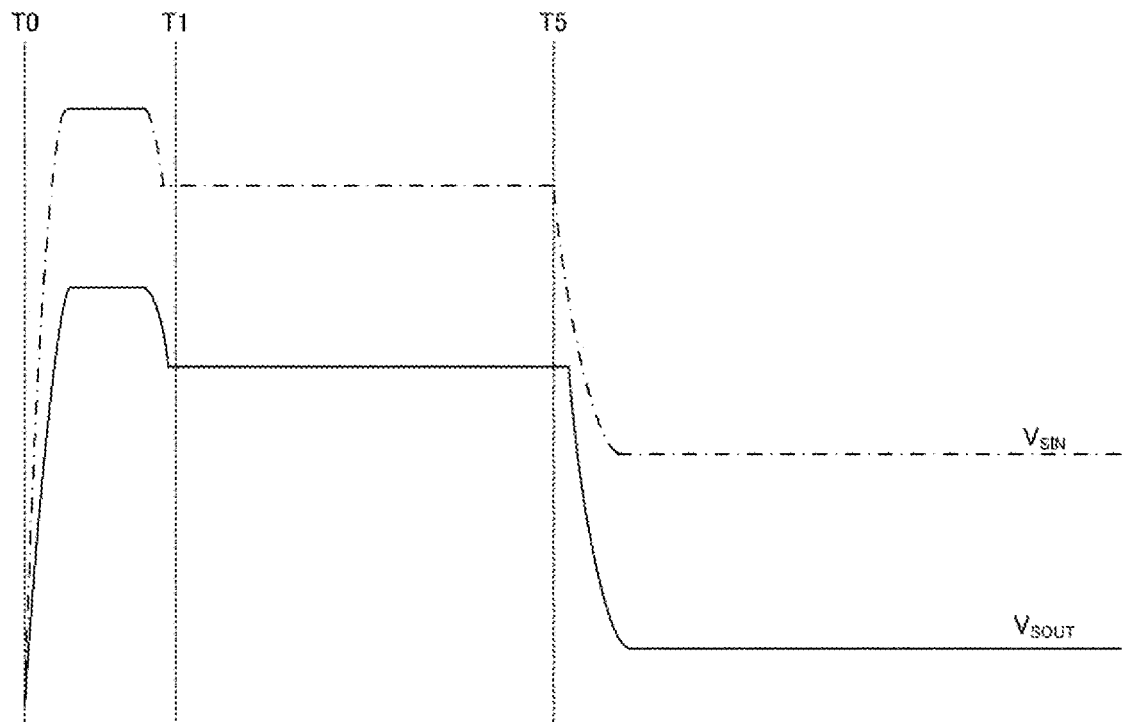
FIGS. 12A and 12B are timing charts illustrating an example of a fluctuation in potential in the first embodiment of the present technology.
Figure 12B:
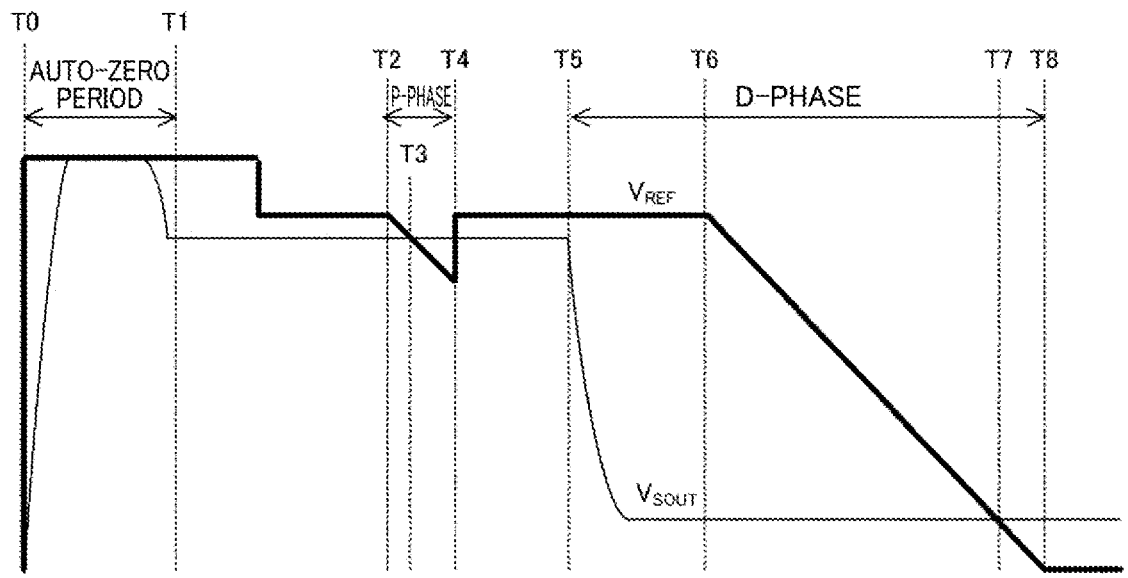

FIGS. 12A and 12B are timing charts illustrating an example of a fluctuation in potential in the first embodiment of the present technology. FIG. 12A in the drawing is a timing chart illustrating an example of fluctuations in a potential VSIN of the input node of the source follower circuit 230 and fluctuations in a potential VSOUT of the output node thereof. FIG. 12B in the drawing is a timing chart illustrating an example of fluctuations in a potential VREF and a potential VSOUT of a reference signal.

As illustrated in FIG. 12A in the drawing, the source follower circuit 230 outputs the potential VSOUT corresponding to the potential VSIN of the input node from the output node in an auto-zero period at a timing between T0 and T1. A relationship between these potentials is represented by Expression 1. In addition, when charge is transferred at a timing T5, the potential VSIN is decreased in accordance with the amount of charge.

In addition, as illustrated in FIG. 12B in the drawing, a potential VSOUT of a pixel signal is consistent with the potential VREF of the reference signal in the auto-zero period at the timing between T0 and T1. The DAC 251 changes the potential VREF of the reference signal to a slope shape in a period at a timing between T2 and T4 after auto-zero. The ADC 310 holds a time code at a timing T3 when the potential VREF is consistent with the potential VSOUT, and outputs the time code as a digital signal into which the P phase is converted.

In addition, when charge is transferred at a timing T5 after the P-phase conversion, the potential $V_{SIN}$ is decreased in accordance with the amount of charge. The DAC 251 changes the potential $V_{REF}$ of the reference signal to a slope shape in a period at a timing between T6 and T8 after the conversion. The ADC 310 holds a time code at a timing T7 when the potential $V_{REF}$ is consistent with the potential $V_{SOUT}$, and outputs the time code as a digital signal into which the D phase is converted.

Figure 13A:
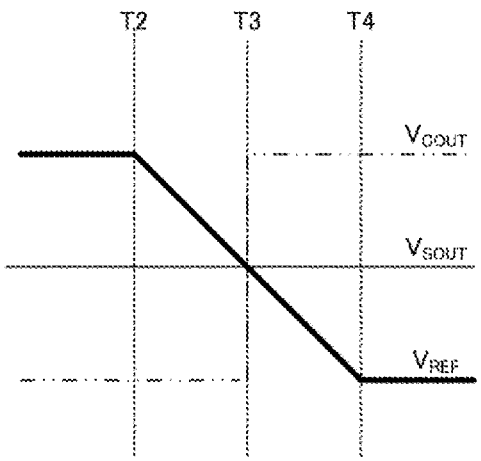
FIGS. 13A and 13B are diagrams illustrating examples of inversion timings of outputs of differential amplifier circuits in the first embodiment of the present technology and a first comparative example.
Figure 13B:
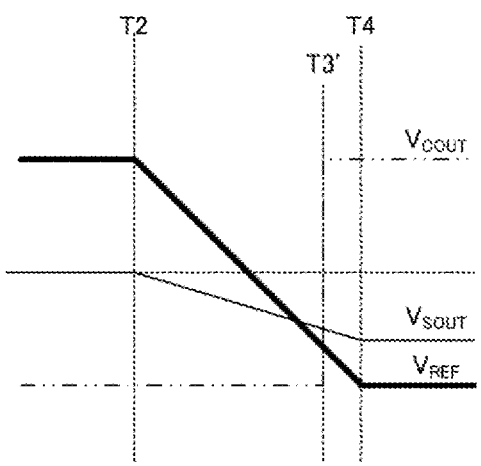

FIGS. 13A and 13B are diagrams illustrating examples of inversion timings of outputs of the differential amplifier circuits 330 in the first embodiment of the present technology and a first comparative example. FIG. 13A in the drawing is a diagram illustrating an example of an inversion timing of an output of the differential amplifier circuit 330 in the first embodiment. FIG. 13B in the drawing is a diagram illustrating an example of an inversion timing of an output of the differential amplifier circuit 330 in the first comparative example.

As illustrated in FIG. 13A in the drawing, in the first embodiment in which the source follower circuit 230 is added, a potential VCOUT of an output node of the differential amplifier circuit 330 is inverted at a timing T3 when a potential VREF of a reference signal is consistent with a potential VSOUT of an output of the source follower circuit 230.

On the other hand, as illustrated in FIG. 13B in the drawing, in the first comparative example in which the source follower circuit 230 is not provided, the potential VCOUT of the output node is inverted at a timing T3' delayed from the timing T3. This is because an error occurs in the value of the potential VREF when the potential is consistent with a potential VSIN as describe above, and a propagation delay time of the differential amplifier circuit 330 is greatly increased. In the first comparative example, a period at a timing between T3 and T4 (that is, an AD conversion period) when a reference signal is changed to a slope shape is required to be set to be long in consideration of this delay, and there is a concern that a frame rate may be reduced due to an increase in the AD conversion period.

On the other hand, in a configuration in which the source follower circuit 230 is added, a delay does not occur, and thus it is possible to set the AD conversion period to be shorter than that in the first comparative example and to improve a frame rate.

Here, as described above with reference to FIG. 10, in a valid pixel, a potential $V_{SIN}$ of the floating diffusion layer 224 at the time of reset (auto-zero) is represented by Expression 1. In a case where it is assumed that a potential $V_{SOUT}$ and a potential $V_{REF}$ of a reference signal are substantially consistent with each other, Expression 1 can be replaced with the following expression.

$$V_{SIN} = V_{REF} + V_{GS} \quad \text{(Expression 2)}$$

The potential $V_{SIN}$ of the floating diffusion layer 224 at the time of auto-zero needs to be set to be as high as possible in order to increase the efficiency of transfer of charge from the photoelectric conversion element 222 to the floating diffusion layer 224 and increase the amount of saturated charge. On the other hand, the potential $V_{SIN}$ at the time of auto-zero has to be equal to or less than a certain upper limit value $V_{MAX}$ so that a feedback loop including a comparator and a source follower circuit 280 is not saturated.

However, a voltage $V_{GS}$ between the gate and the source of the source follower transistor 231 actually has a variation due to a process for each chip and a fluctuation in temperature. When the variation due to a process and temperature is set to be $\pm\Delta V$, the potential $V_{SIN}$ at the time of auto-zero is represented by the following expression.

$$V_{SIN} = V_{REF} + V_{GS} \pm \Delta V \quad \text{(Expression 3)}$$

From Expression 3, in order to set the potential $V_{SIN}$ to be equal to or less than an upper limit value $V_{MAX}$ even when the voltage $V_{GS}$ between the gate and the source varies the most, it is necessary to satisfy the following expression.

$$V_{SIN} = V_{REF} + V_{GS} + \Delta V \leq V_{MAX} \quad \text{(Expression 4)}$$

When Expression 4 is modified, the following expression is obtained.

$$V_{REF} \leq V_{MAX} - (V_{GS} + \Delta V) \quad \text{(Expression 5)}$$

In a case where the largest $V_{REF}$ satisfying Expression 5 is set, and a variation in the voltage $V_{GS}$ between the gate and the source is actually the smallest, that is, $-\Delta V$, the potential $V_{SIN}$ of the floating diffusion layer 224 at the time of auto-zero is represented by the following expression.

$$V_{SIN} = V_{REF} + V_{GS} - \Delta V \quad \text{(Expression 6)}$$
$$= V_{MAX} - (V_{GS} + \Delta V) - \Delta V$$
$$= V_{MAX} - V_{GS} - 2\Delta V$$

From Expression 6, as compared to a case where a variation in the voltage $V_{GS}$ between the gate and the source is set to be the largest, the potential $V_{SIN}$ at the time of auto-zero is decreased by $2\Delta V$. When the transfer of charge from the photoelectric conversion element 222 to the floating diffusion layer 224 is designed with reference to Expression 6, the amount of saturated charge is reduced, which is disadvantageous in terms of charge transfer.

In order to prevent the above-described efficiency of charge transfer from being reduced, the signal processing circuit 400 measures a voltage $V_{GS}$ between the gate and the source in measurement pixels in the OPB regions 213 and 215, and the potential $V_{REF}$ of the reference signal is corrected based on the measured value thereof.

Figure 14:
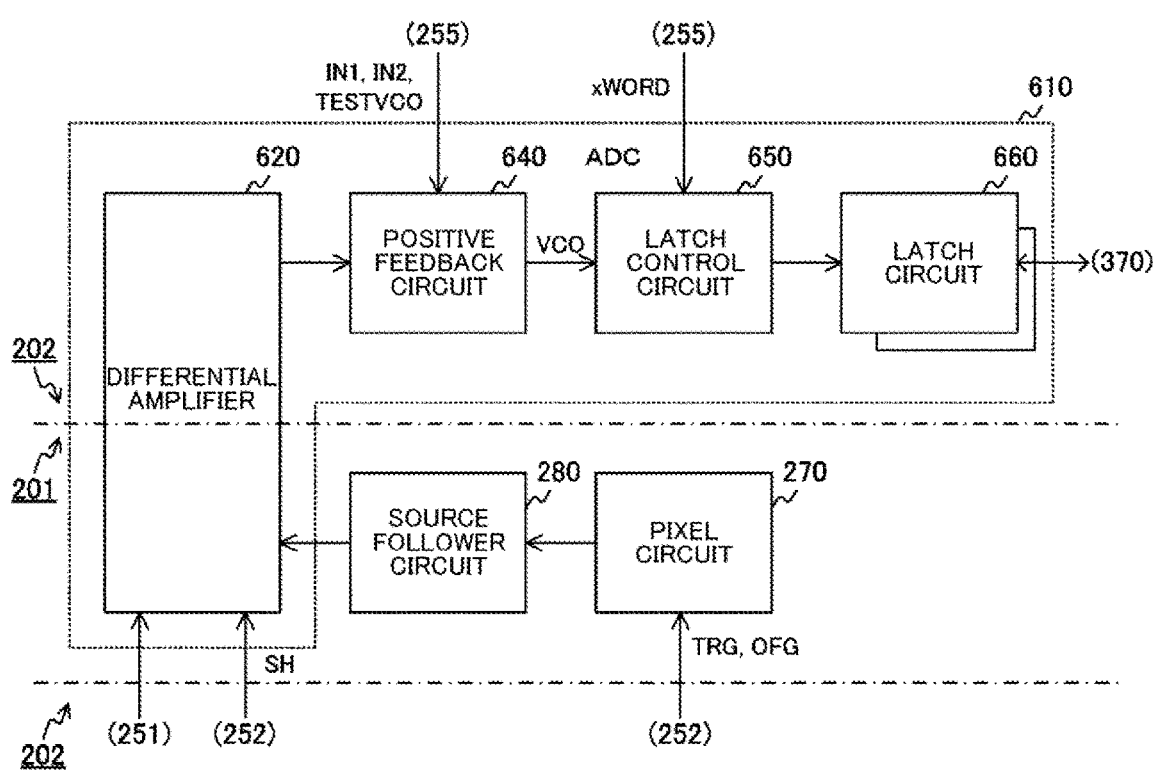
FIG. 14 is a block diagram illustrating configuration examples of a measurement pixel and an ADC in the first embodiment of the present technology.

FIG. 14 is a block diagram illustrating configuration examples of a measurement pixel and an ADC 610 in the first embodiment of the present technology. The ADC 610 includes a differential amplifier 620, a positive feedback circuit 640, a latch control circuit 650, and a plurality of latch circuits 660. A function of each of circuits in the ADC 610 is the same as that of a circuit having the same name in the ADC 310 corresponding to a valid pixel.

In addition, the source follower circuit 280 is disposed between the pixel circuit 270 and the ADC 610. A circuit constituted by the pixel circuit 270 and the source follower circuit 280 functions as one measurement pixel.

Figure 15:
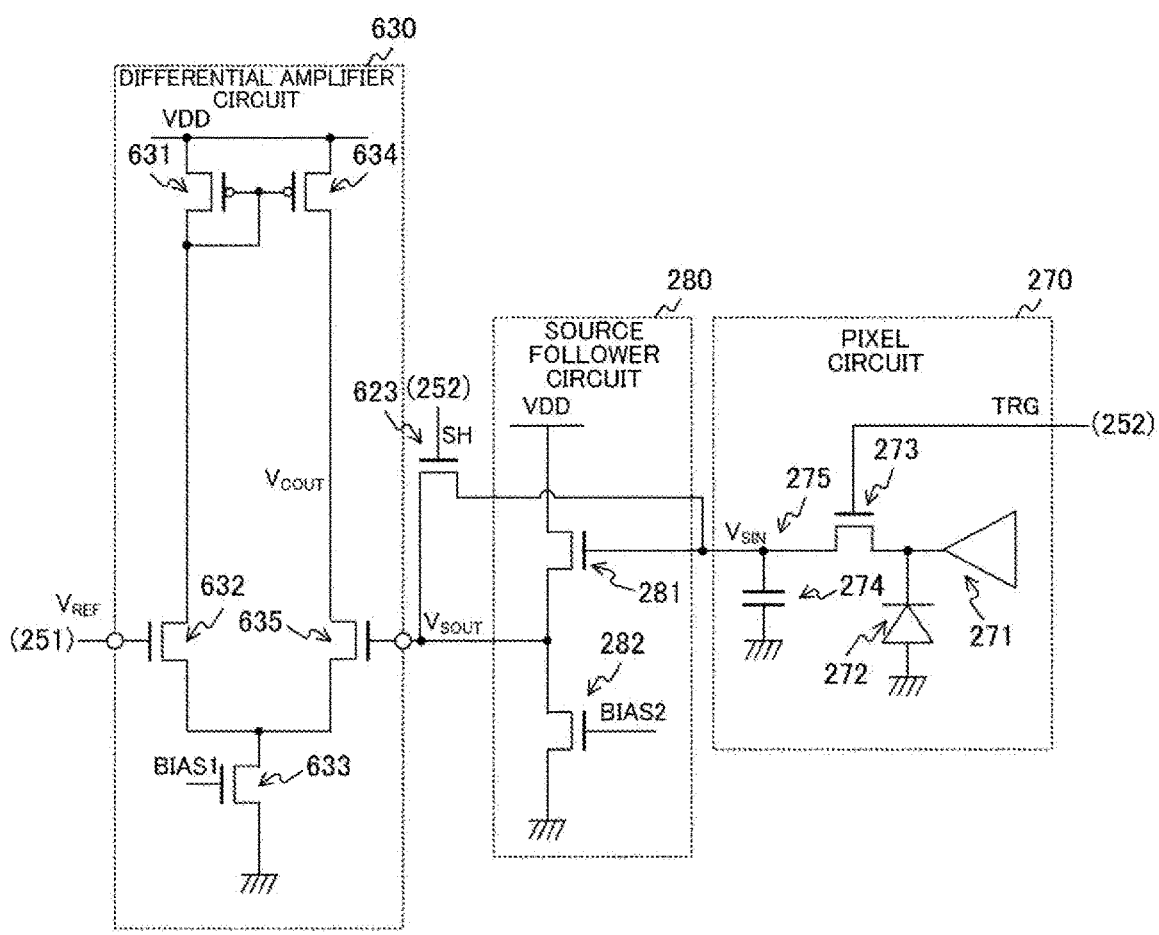
FIG. 15 is a circuit diagram illustrating configuration examples of a source follower circuit and a pixel circuit in the first embodiment of the present technology.

FIG. 15 is a circuit diagram illustrating configuration examples of the source follower circuit 280 and the pixel circuit 270 in a measurement pixel in the first embodiment of the present technology. The pixel circuit 270 includes a discharge transistor 271, a photoelectric conversion element 272, a transfer transistor 273, and a floating diffusion layer 274. The source follower circuit 280 includes a source follower transistor 281 and a current source transistor 282.

In addition, a differential amplifier circuit 630 and a short-circuit transistor 623 are disposed in the differential amplifier 620. The differential amplifier circuit 630 includes pMOS transistors 631 and 634, differential transistors 632 and 635, and a current source transistor 633.

In the drawing, a connection configuration of elements other than the short-circuit transistor 623 is the same as that of the elements having the same names on the valid pixel side illustrated in FIG. 10. Comparing FIG. 10 and FIG. 15 with each other, the auto-zero transistor 323 on the valid pixel side is disposed on the measurement pixel side, and the short-circuit transistor 623 is disposed instead. In addition, the discharge transistor 271 is used to apply a predetermined external voltage (2 V or the like) to the photoelectric conversion element 272. For this reason, the discharge transistor 271 is represented by a graphic symbol of an amplifier.

The short-circuit transistor 623 short-circuits the gate and the source of the source follower transistor 281 in response to a control signal SH from the pixel driving circuit 252.

There is little variation in a gate-source voltage of a transistor in a chip. For this reason, as illustrated in FIG. 15, a measurement pixel having substantially the same layout as that of a valid pixel is provided, and the short-circuit transistor 623 thereof is turned on or off, thereby making it possible to measure a voltage which is substantially consistent with a gate-source voltage in the valid pixel.

Here, the gate-source voltage is smaller than a variation between chips, but also varies for each pixel even within a chip. It is preferable to dispose a plurality of measurement pixels and obtain a statistic (an average or the like) of the measured values thereof in consideration of the variation in the chip.

Figure 16:
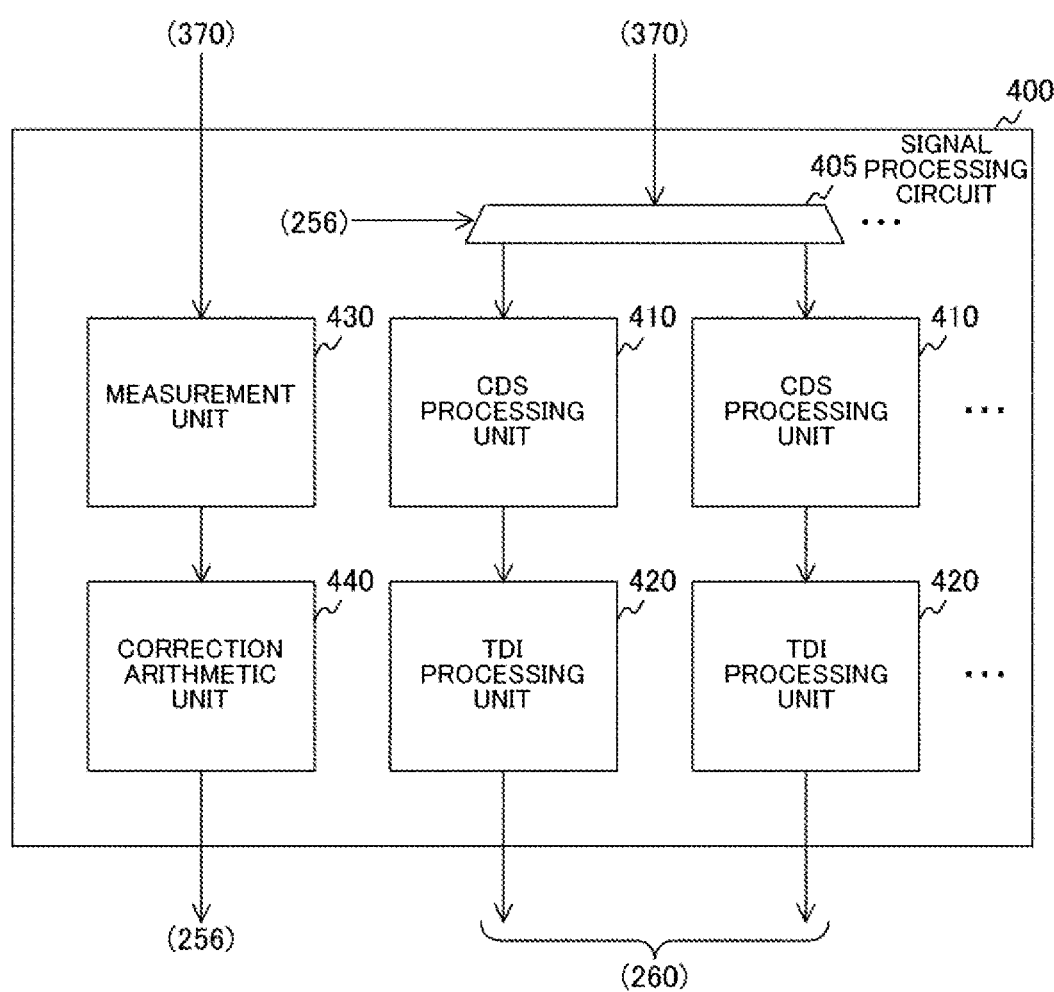
FIG. 16 is a block diagram illustrating a configuration example of a signal processing unit in the first embodiment of the present technology.

FIG. 16 is a block diagram illustrating a configuration example of the signal processing circuit 400 in the first embodiment of the present technology. The signal processing circuit 400 includes a measurement unit 430 and a correction arithmetic unit 440. Further, the signal processing circuit 400 includes a plurality of selectors 405, a plurality of CDS processing units 410, and a plurality of TDI processing units 420.

The measurement unit 430 measures a gate-source voltage of the source follower transistor 281 in a measurement pixel. The pixel driving circuit 252 turns on the short-circuit transistor 623 while applying an external voltage to the discharge transistor 271 at the time of measurement, and the ADC 610 performs only D-phase conversion. The measurement unit 430 holds the value of a D-phase of each of measurement pixels as V1 in a memory or the like.

Then, the pixel driving circuit 252 sets the short-circuit transistor 623 to be in an off-state while applying an external voltage, and the ADC 610 performs only D-phase conversion. The measurement unit 430 holds the value of a D-phase of each of measurement pixels as V2 in a memory or the like. The measurement unit 430 arithmetically calculates a difference between V1 and V2 for each measurement pixel. The difference indicates a measured value of a gate-source voltage of the source follower transistor 281 in a measurement pixel. The measurement unit 430 supplies a difference (that is, a measured value) for each measurement pixel to the correction arithmetic unit 440.

The correction arithmetic unit 440 arithmetically calculates a correction value of a potential $V_{REF}$ of a reference signal based on the measured value. The correction arithmetic unit 440 arithmetically calculates a statistic of a measured value of each of the plurality of measurement pixels. For example, an average value of the measured values is arithmetically calculated as $V_{GS\_ave}$. The correction arithmetic unit 440 supplies the arithmetically calculated average value $V_{GS\_ave}$ to the control circuit 256 as a correction value.

The control circuit 256 sets a potential corrected using the correction value ($V_{GS\_ave}$) as a reference signal in the DAC 251. For example, the potential $V_{REF}$ of the reference signal is set to a value that satisfies the following expression.

$$V_{REF} = V_{MAX} - V_{GS\_ave} \quad \text{(Expression 7)}$$

Actually, a gate-source voltage has a variation between pixels in a chip, and thus it is preferable that the potential $V_{REF}$ of the reference signal be set to a value that satisfies the following expression.

$$V_{REF} = V_{MAX} - V_{GS\_ave} - V_{margin}$$

In the above expression, $V_{margin}$ is a margin voltage taking a variation within a chip into consideration. However, a variation within a chip is smaller than a variation between chips, and thus a margin $V_{margin}$ is a small value.

The selector 405 is disposed for each column of the cluster 300 in a valid pixel region, in other words, for each repeater unit 370. In a case where the ADCs 310 of two columns are arranged in the cluster 300, the selector 405 is disposed for every two columns. In addition, the CDS processing unit 410 and the TDI processing unit 420 are disposed for each column of the ADC 310. In a case where the ADC 310 has M columns, M/2 selectors 405, M CDS processing units 410, and M TDI processing units 420 are disposed.

As described above, the repeater unit 370 outputs digital signals of odd-numbered rows and digital signals of even-numbered rows in order.

The selector 405 selects an output destination of a digital signal in a valid pixel under the control of the control circuit 256. In a case where digital signals of odd-numbered columns are output by the repeater unit 370, the selector 405 outputs the digital signals to the CDS processing units 410 corresponding to the odd-numbered columns. On the other hand, in a case where digital signals of even-numbered columns are output, the selector 405 outputs the digital signals to the CDS processing units 410 corresponding to the even-numbered columns.

The CDS processing unit 410 performs CDS processing for obtaining a difference between a P-phase and a D-phase on the digital signals output from the selector 405. The CDS processing unit 410 supplies a digital signal of the difference to the TDI processing unit 420.

The TDI processing unit 420 performs TDI processing for integrating digital signals on a digital signal after TDI processing while shifting a time in accordance with a moving speed of a subject. The TDI processing unit 420 supplies the digital signal after the TDI processing to the image processing circuit 260.

Figure 17:
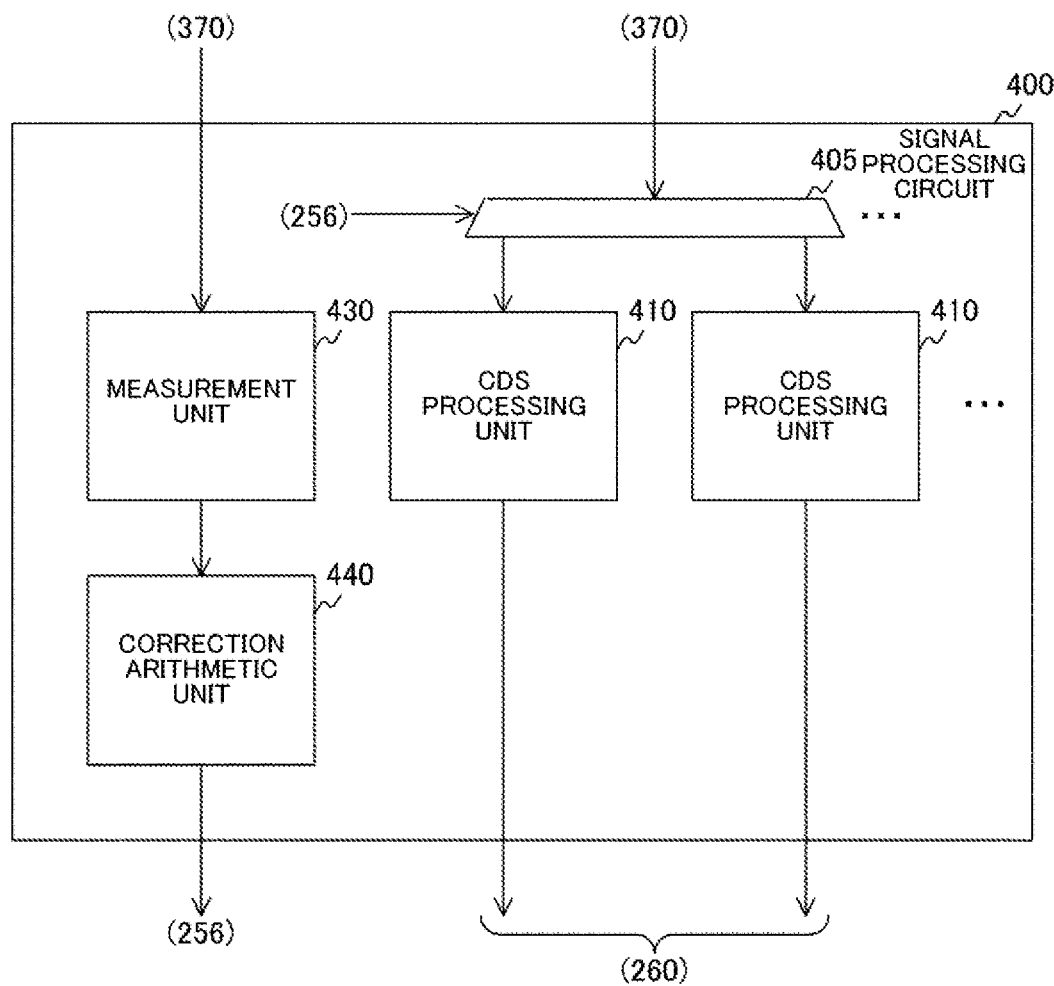
FIG. 17 is a block diagram illustrating another example of a signal processing circuit in the first embodiment of the present technology.

Note that, although the TDI processing unit 420 is provided in the signal processing circuit 400, a configuration in which the TDI processing unit 420 is not disposed can also be adopted as illustrated in FIG. 17. The solid-state imaging element 200 can be used in a device for which TDI processing is not necessary, such as a digital camera or a smart phone.

Figure 18:
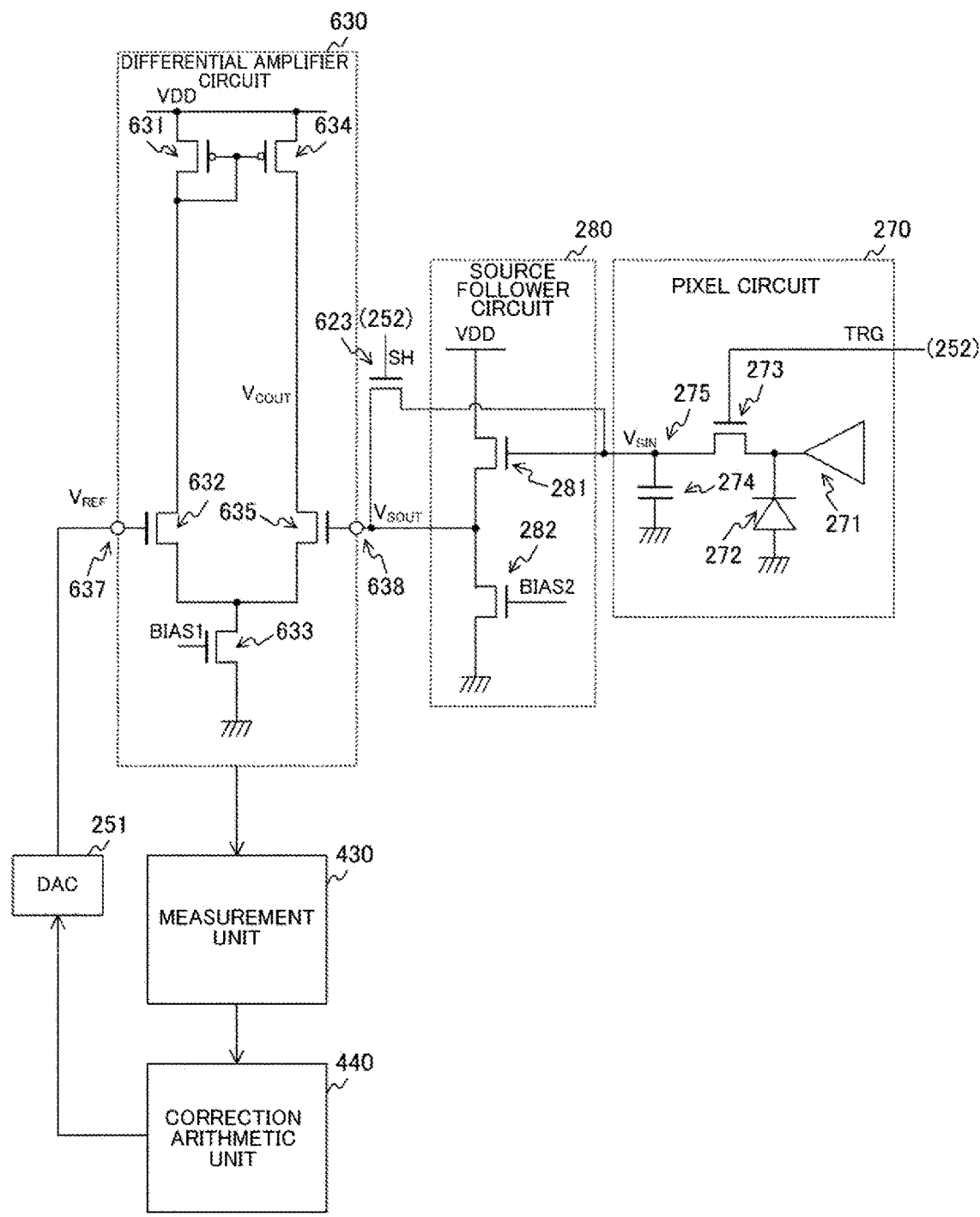
FIG. 18 is a diagram illustrating a correction method in the first embodiment of the present technology.

FIG. 18 is a diagram illustrating a correction method in the first embodiment of the present technology. The measurement unit 430 holds, for each measurement pixel, a value V1 of a D-phase when the short-circuit transistor 623 is set to be in an on-state, and a value V2 of a D-phase when the short-circuit transistor 623 is set to be in an off-state. In addition, the measurement unit 430 arithmetically calculates a difference between V1 and V2 for each measurement pixel and supplies the difference to the correction arithmetic unit 440 as a measured value of a gate-source voltage.

The correction arithmetic unit 440 arithmetically calculates an average value $V_{GS\_ave}$ of the measured values as a correction value. The DAC 251 supplies a reference signal having a potential corrected based on the correction value to one of input nodes of the differential amplifier circuits 630 in the valid pixel region 215. Note that a reference signal having a fixed amplitude which has not been corrected is input to a differential amplifier circuit in the OPB region 215.

Figure 19:
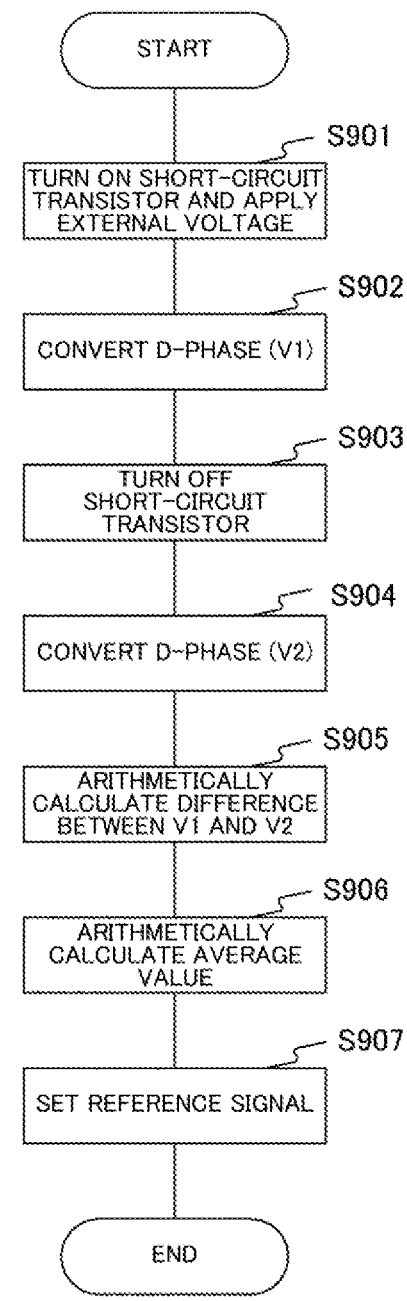
FIG. 19 is a flowchart illustrating an example of measurement processing in the first embodiment of the present technology.

FIG. 19 is a flowchart illustrating an example of measurement processing in the first embodiment of the present technology. The measurement processing is executed, for example, at any one timing of a timing when a frame is imaged, the time of start-up after chip inspection, and the time of chip inspection.

The pixel driving circuit 252 sets the short-circuit transistor 623 to be in an on-state and applies an external voltage to the discharge transistor 271 (step S901). The ADC 310 converts only a D-phase of a measurement pixel in the same manner as a valid pixel, and the measurement unit 430 holds a conversion result as V1 in the memory (step S902).

The pixel driving circuit 252 sets the short-circuit transistor 623 to be in an off-state while applying an external voltage (step S903). The ADC 310 converts only a D-phase of a measurement pixel, and the measurement unit 430 holds a conversion result as V2 in the memory (step S904). The measurement unit 430 arithmetically calculates a difference between V1 and V2 as a measured value for each measurement pixel (step S905).

The correction arithmetic unit 440 arithmetically calculates an average value $V_{GS\_ave}$ of measured values as a correction value (step S906). The control circuit 256 sets a reference signal that satisfies Expression 5 and Expression 7 in the DAC 251 based on the correction value (step S907). After step S907, the solid-state imaging element 200 terminates the measurement processing.

In a case where the above-described measurement processing is executed for each frame, a measured value measured at the time of imaging of a certain frame is reflected in a reference signal at the time of imaging of the next frame. In this manner, in a case where measurement processing is performed during an imaging operation, the amount of arithmetic operation increases, but a variation due to a fluctuation in temperature can be corrected, and thus the accuracy of correction is increased.

On the other hand, in a case where measurement processing is executed at the time of start-up, the value of a reference signal which is set at the time of start-up is used at all times after start-up. In this manner, in a case where measurement processing is performed only at the time of start-up, the amount of arithmetic operation is small, but a variation due to a fluctuation in temperature during an imaging operation cannot be corrected.

Further, in a case where measurement processing is executed at the time of chip inspection, the value of a reference signal which is set at the time of chip inspection is used at all times at the time of chip inspection. In this manner, in a case where measurement processing is performed only at the time of chip inspection, it is not necessary to arithmetically calculate a correction value after chip inspection (at the time of start-up and during an imaging operation), but a variation due to a fluctuation in temperature cannot be corrected.

In this manner, according to the first embodiment of the present technology, the source follower circuit 230 supplies a potential corresponding to the potential of the floating diffusion layer to the input node 338 of the differential amplifier circuit 330, and thus it is possible to suppress a fluctuation in the potential of the input node 338 due to a fluctuation in a reference signal. Thereby, it is possible to suppress an increase in an AD conversion period caused by a fluctuation in the potential of the input node 338.

Further, the measurement unit 430 measures a gate-source voltage of the source follower transistor 281, and the correction arithmetic unit 440 arithmetically calculates a correction value of a reference signal based on the measured value, thereby making it possible to correct the reference signal to improve the efficiency of transfer of charge.

2. Second Embodiment

In the above-described first embodiment, a measurement pixel is disposed in the OPB regions 213 and 215 to measure a gate-source voltage in the measurement pixel. However, in general, the number of pixels of an OPB region is smaller than the number of pixels of a valid pixel region, and there is a concern that the number of measured values may be insufficient. A solid-state imaging element 200 in a second embodiment is different from that in the first embodiment in that a gate-source voltage in a valid pixel is measured.

Figure 20:
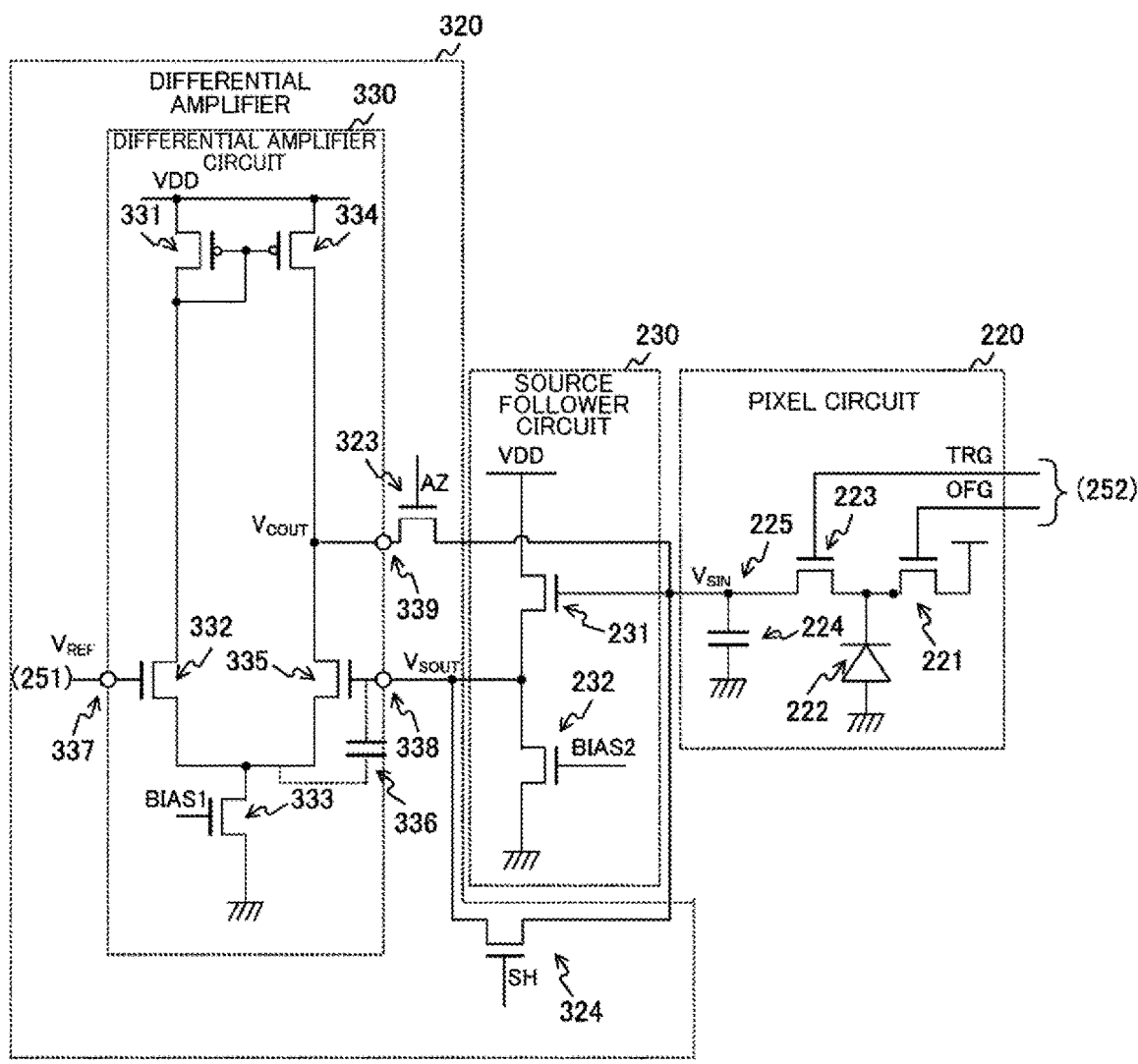
FIG. 20 is a circuit diagram illustrating configuration examples of a differential amplifier, a source follower circuit, and a pixel circuit in a valid pixel in a second embodiment of the present technology.

FIG. 20 is a circuit diagram illustrating configuration examples of a differential amplifier 320, a source follower circuit 230, and a pixel circuit 220 in a valid pixel in the second embodiment of the present technology. A short-circuit transistor 324 is further disposed in the differential amplifier 320 on the valid pixel side in the second embodiment.

The short-circuit transistor 324 short-circuits a gate and a source of a source follower transistor 231 of the valid pixel in response to a control signal SH from a pixel driving circuit 252.

In addition, a measurement pixel is not disposed in OPB regions 213 and 215 in the second embodiment.

Measurement processing in the second embodiment is the same as that in the first embodiment other than a D-phase in a valid pixel is read. However, in the second embodiment, measurement processing cannot be executed for each frame, and measurement processing is executed at the time of start-up or at the time of chip inspection.

In general, the number of pixels of a valid pixel region 214 is larger than the number of pixels of the OPB regions 213 and 215, and thus more measured values than in the first embodiment can be measured in the second embodiment. Thereby, it is possible to improve the accuracy of correction.

In this manner, according to the second embodiment of the present technology, since the measurement unit 430 measures a gate-source voltage in a valid pixel, it is possible to acquire more measured values than the number of pixels in the OPB region and improve the accuracy of correction.

3. Example of Application to Moving Body

The technology according to the present disclosure (the present technology) can be applied to various products. For example, the technology according to the present disclosure may be realized as a device equipped in any type of moving body such as an automobile, an electric vehicle, a hybrid electric vehicle, a motorcycle, a bicycle, a personal mobility device, an airplane, a drone, a ship, and a robot.

Figure 21:
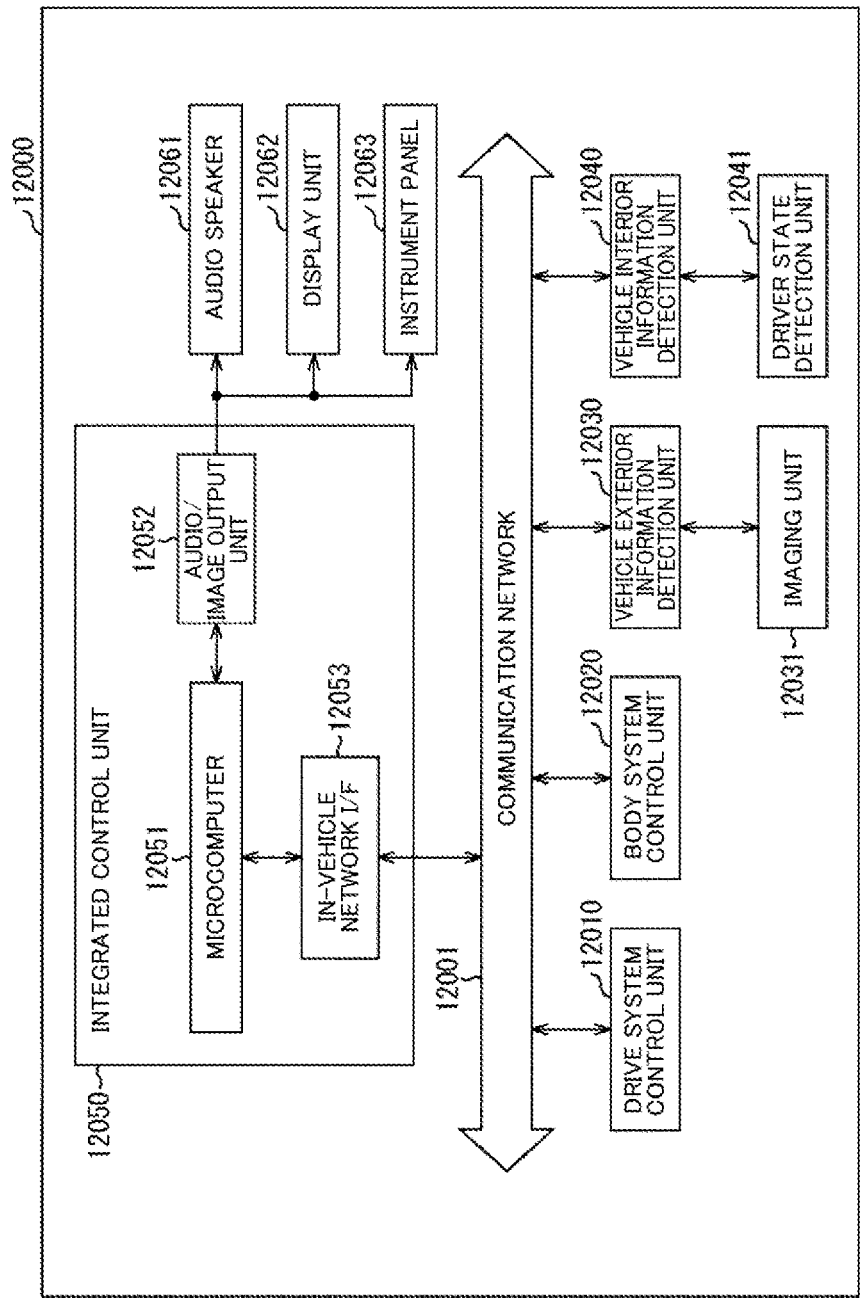
FIG. 21 is a block diagram illustrating a schematic configuration example of a vehicle control system.

FIG. 21 is a block diagram illustrating a schematic configuration example of a vehicle control system, which is an example of a moving body control system to which the technique according to the present disclosure can be applied.

The vehicle control system 12000 includes a plurality of electronic control units connected thereto via a communication network 12001. In the example illustrated in FIG. 21, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls an operation of an apparatus related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle having the vehicle control system 12000 mounted thereon. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform object detection processing or distance detection processing for peoples, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information acquired by the vehicle exterior information detection unit 12030 or the vehicle interior information detection unit 12040 inside and outside the vehicle, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

Further, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12020 based on the information acquired by the vehicle exterior information detection unit 12030 outside the vehicle. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio/image output unit 12052 transmits an output signal of at least one of sound and an image to an output device capable of visually or audibly notifying a passenger or the outside of the vehicle of information. In the example of FIG. 21, an audio speaker 12061, a display unit 12062, and an instrument panel 12063 are illustrated as examples of the output device. The display unit 12062 may include at least one of an on-board display and a head-up display, for example.

Figure 22:
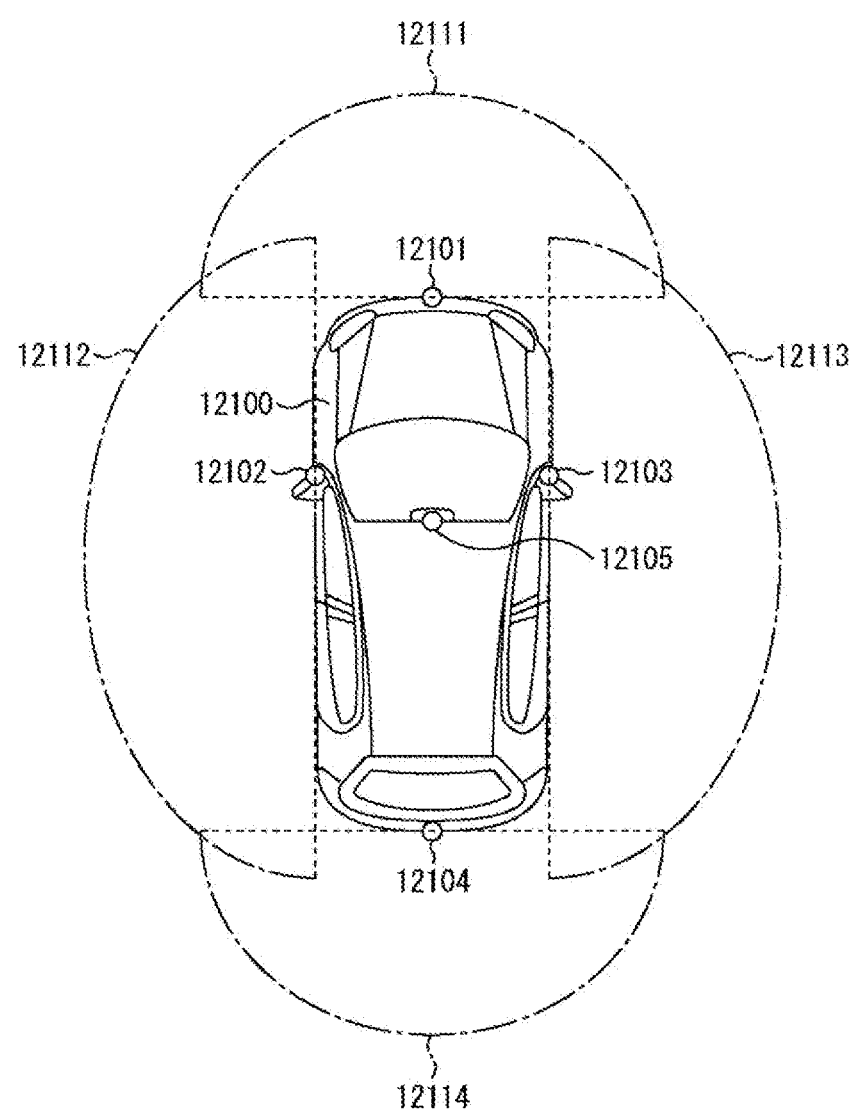
FIG. 22 is a diagram illustrating an example of an installation position of an imaging unit.

FIG. 22 is a diagram illustrating an example of an installation position of the imaging unit 12031.

In FIG. 22, imaging units 12101, 12102, 12103, 12104, and 12105 are provided as the imaging units 12031.

The imaging units 12101, 12102, 12103, 12104, and 12105 are provided at positions such as a front nose, side-view mirrors, a rear bumper, a back door, and an upper portion of a windshield in a vehicle interior of the vehicle 12100, for example. The imaging unit 12101 provided on the front nose and the imaging unit 12105 provided in the upper portion of the windshield in the vehicle interior mainly acquire images of the front of the vehicle 12100. The imaging units 12102 and 12103 provided on the side-view mirrors mainly acquire images of a lateral side of the vehicle 12100. The imaging unit 12104 provided on the rear bumper or the back door mainly acquires images of the rear of the vehicle 12100. The imaging unit 12105 provided in the upper portion of the windshield in the vehicle interior is mainly used for detection of preceding vehicles, pedestrians, obstacles, traffic signals, traffic signs, lanes, and the like.

FIG. 22 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by acquiring a distance to each three-dimensional object in the imaging ranges 12111 to 12114 and temporal change in the distance (a relative speed with respect to the vehicle 12100) on the basis of distance information obtained from the imaging units 12101 to 12104. Furthermore, the microcomputer 12051 can set an inter-vehicle distance to be secured in advance in front of a preceding vehicle and can perform automated brake control (also including following stop control) or automated acceleration control (also including following start control). This can perform cooperative control for the purpose of, for example, autonomous driving in which the vehicle autonomously travels without the need for driver's operations.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio/image output unit 12052 controls the display unit 12062 so that a square contour line for emphasis is superimposed and displayed with the recognized pedestrian. In addition, the audio/image output unit 12052 may control the display unit 12062 so that an icon indicating a pedestrian or the like is displayed at a desired position.

An example of the vehicle control system to which the technology according to the present disclosure can be applied has been described above. The technology according to the present disclosure can be applied to the imaging unit 12031 within the configuration described above. Specifically, for example, the imaging device 100 of FIG. 1 can be applied to the imaging unit 12031. It is possible to improve a frame rate and generate a movie with higher image quality by applying the technology according to the present disclosure to the imaging unit 12031.

It should be noted that the above-described embodiments show examples for embodying the present technology, and matters in the embodiments and matters specifying the invention in the claims have a corresponding relationship with each other. Similarly, the matters specifying the invention in the claims and the matters in the embodiments of the present technology having the same name have a corresponding relationship with each other. However, the present technology is not limited to the embodiments and can be embodied by applying various modifications to the embodiments without departing from the gist thereof.

The effects described in the present specification are merely examples and are not intended as limiting, and other effects may be obtained.

The present technology can also have the following configurations.

(1) A solid-state imaging element including:
a differential amplifier circuit that amplifies a difference in potential between a pair of input nodes and outputs the difference from an output node;
a transfer transistor that transfers charge from a photoelectric conversion element to a floating diffusion layer;
a source follower transistor that is configured such that a gate is connected to the floating diffusion layer, and a source is connected to one of the pair of input nodes;
a measurement unit that measures a gate-source voltage of the source follower transistor and supplies a measured value; and
a correction arithmetic unit that arithmetically calculates a correction value for correcting a potential of the other one of the pair of input nodes based on the measured value.

(2) The solid-state imaging element according to (1), further including:
a short-circuit transistor that short-circuits the source and the gate of the source follower transistor in response to a predetermined control signal,
wherein the differential amplifier circuit, the transfer transistor, and the source follower transistor are disposed in each of a valid pixel and a measurement pixel,
the short-circuit transistor is disposed in the measurement pixel, and
the measurement unit measures the gate-source voltage of the measurement pixel.

(3) The solid-state imaging element according to (2), wherein the measurement unit measures the gate-source voltage every time a frame is imaged.

(4) The solid-state imaging element according to (2), wherein the measurement unit measures the gate-source voltage at the time of start-up.

(5) The solid-state imaging element according to (2), wherein the measurement unit measures the gate-source voltage at the time of chip inspection.

(6) The solid-state imaging element according to (1), further including:
a short-circuit transistor that short-circuits the source and the gate of the source follower transistor in response to a predetermined control signal,
wherein the differential amplifier circuit, the transfer transistor, the source follower transistor, and the short-circuit transistor are disposed in a valid pixel, and
the measurement unit measures the gate-source voltage of the valid pixel.

(7) The solid-state imaging element according to (6), wherein the measurement unit measures the gate-source voltage at the time of start-up.

(8) The solid-state imaging element according to (6), wherein the measurement unit measures the gate-source voltage at the time of chip inspection.

(9) The solid-state imaging element according to any one of (1) to (8), wherein the measurement unit measures, as the measured value, a difference between a digital signal corresponding to a signal output from the differential amplifier circuit when the source and the gate are short-circuited and a digital signal corresponding to a signal output from the differential amplifier circuit when the source and the gate are not short-circuited, and
the correction arithmetic unit arithmetically calculates a statistic of the measured value as the correction value.

(10) The solid-state imaging element according to any one of (1) to (9), further including:
a delay time integration processing unit that performs time delay integration processing on a digital signal corresponding to a signal output from the differential amplifier circuit.

(11) The solid-state imaging element according to any one of (1) to (10), wherein a portion of the differential amplifier circuit, the transfer transistor, and the source follower transistor are provided in a predetermined light reception chip, and the rest of the differential amplifier circuit, the measurement unit, and the correction arithmetic unit are provided in a predetermined circuit chip.

(12) The solid-state imaging element according to (11), wherein the light reception chip and the circuit chip are connected to each other by a Cu—Cu junction.

(13) An imaging device including:
a differential amplifier circuit that amplifies a difference in potential between a pair of input nodes and outputs the difference from an output node;
a transfer transistor that transfers charge from a photoelectric conversion element to a floating diffusion layer;
a source follower transistor that is configured such that a gate is connected to the floating diffusion layer, and a source is connected to one of the pair of input nodes;
a measurement unit that measures a gate-source voltage of the source follower transistor and supplies a measured value;
a correction arithmetic unit that arithmetically calculates a correction value for correcting the potential of the other one of the pair of input nodes based on the measured value; and
a storage unit that stores a frame in which digital signals corresponding to signals output from the differential amplifier circuit are arranged.

(14) A method of controlling a solid-state imaging element, the method including:
transferring charge from a photoelectric conversion element to a floating diffusion layer;
measuring a gate-source voltage of a source follower transistor in which a gate is connected to the floating diffusion layer, and a source is connected to one of a pair of input nodes of a differential amplifier circuit, and supplying a measured value; and arithmetically calculating a correction value for correcting a potential of the other one of the pair of input nodes based on the measured value.

REFERENCE SIGNS LIST

100 Imaging device
110 Optical unit
120 Storage unit
130 Control unit
140 Communication unit
200 Solid-state imaging element
201 Light receiving chip
202 Circuit chip
210 Pixel array unit
211 Pixel block
212 Circuit unit 213, 215 OPB region
214 Pixel region
220, 270 Pixel circuit
221, 271 Discharge transistor
222, 272 Photoelectric conversion element
223, 273 Transfer transistor
224, 274 Floating diffusion layer
230, 280 Source follower circuit
231, 281 Source follower transistor
232, 282, 333, 633 Current source transistor
251 DAC
252 Pixel drive circuit
253 Time code generation unit
254 Pixel A/D conversion unit
255 Vertical scanning circuit
256 Control circuit
257 Output circuit
260 Image processing circuit
300 Cluster
310, 610 ADC
320, 620 Differential amplifier
321, 331, 334, 341, 342, 344, 345, 631, 634 pMOS transistor
322, 343, 346, 347 nMOS transistor
323 Auto-zero transistor
324, 623 Short-circuit transistor
330, 630 Differential amplifier circuit
332, 335, 632, 635 Differential transistor
340, 640 Positive feedback circuit
350, 650 Latch control circuit
360, 660 Latch circuit
370 Repeater unit
400 Signal processing circuit
405 Selector
410 CDS processing unit
420 TDI processing unit
430 Measurement unit
440 Correction arithmetic unit
510 Belt conveyor
511 Subject
12031 Imaging unit

The invention claimed is:

1. A solid-state imaging element, comprising:
a differential amplifier circuit that amplifies a difference in potential between a pair of input nodes and outputs the difference from an output node;
a transfer transistor that transfers charge from a photoelectric conversion element to a floating diffusion layer;
a source follower transistor that is configured such that a gate is connected to the floating diffusion layer, and a source is connected to one of the pair of input nodes;
a measurement unit that measures a gate-source voltage of the source follower transistor and supplies a measured value; and
a correction arithmetic unit that arithmetically calculates a correction value for correcting a potential of the other one of the pair of input nodes based on the measured value.

2. The solid-state imaging element according to claim 1, further comprising:
a short-circuit transistor that short-circuits the source and the gate of the source follower transistor in response to a control signal,
wherein the differential amplifier circuit, the transfer transistor, and the source follower transistor are disposed in each of a valid pixel and a measurement pixel, the short-circuit transistor is disposed in the measurement pixel, and
the measurement unit measures the gate-source voltage of the measurement pixel.

3. The solid-state imaging element according to claim 2, wherein the measurement unit measures the gate-source voltage every time a frame is imaged.

4. The solid-state imaging element according to claim 2, wherein the measurement unit measures the gate-source voltage at a time of start-up.

5. The solid-state imaging element according to claim 2, wherein the measurement unit measures the gate-source voltage at a time of chip inspection.

6. The solid-state imaging element according to claim 1, further comprising:
a short-circuit transistor that short-circuits the source and the gate of the source follower transistor in response to a control signal,
wherein the differential amplifier circuit, the transfer transistor, the source follower transistor, and the short-circuit transistor are disposed in a valid pixel, and
the measurement unit measures the gate-source voltage of the valid pixel.

7. The solid-state imaging element according to claim 6, wherein the measurement unit measures the gate-source voltage at a time of start-up.

8. The solid-state imaging element according to claim 6, wherein the measurement unit measures the gate-source voltage at a time of chip inspection.

9. The solid-state imaging element according to claim 1, wherein the measurement unit measures, as the measured value, a difference between a digital signal corresponding to a signal output from the differential amplifier circuit when the source and the gate are short-circuited and a digital signal corresponding to a signal output from the differential amplifier circuit when the source and the gate are not short-circuited, and
the correction arithmetic unit arithmetically calculates a statistic of the measured value as the correction value.

10. The solid-state imaging element according to claim 1, further comprising:
a delay time integration processing unit that performs time delay integration processing on a digital signal corresponding to a signal output from the differential amplifier circuit.

11. The solid-state imaging element according to claim 1, wherein a portion of the differential amplifier circuit, the transfer transistor, and the source follower transistor are provided in a light reception chip, and
the rest of the differential amplifier circuit, the measurement unit, and the correction arithmetic unit are provided in a circuit chip.

12. The solid-state imaging element according to claim 11, wherein the light reception chip and the circuit chip are connected to each other by a Cu—Cu junction.

13. An imaging device, comprising:
a differential amplifier circuit that amplifies a difference in potential between a pair of input nodes and outputs the difference from an output node;
a transfer transistor that transfers charge from a photoelectric conversion element to a floating diffusion layer;
a source follower transistor that is configured such that a gate is connected to the floating diffusion layer, and a source is connected to one of the pair of input nodes;
a measurement unit that measures a gate-source voltage of the source follower transistor and supplies a measured value;

a correction arithmetic unit that arithmetically calculates a correction value for correcting the potential of the other one of the pair of input nodes based on the measured value; and a storage unit that stores a frame in which digital signals corresponding to signals output from the differential amplifier circuit are arranged.

14. A method of controlling a solid-state imaging element, the method comprising:

transferring charge from a photoelectric conversion element to a floating diffusion layer;

measuring a gate-source voltage of a source follower transistor in which a gate is connected to the floating diffusion layer, and a source is connected to one of a pair of input nodes of a differential amplifier circuit, and supplying a measured value; and arithmetically calculating a correction value for correcting a potential of the other one of the pair of input nodes based on the measured value.

* * * * *